(12) United States Patent
Shibuya et al.

(10) Patent No.: US 9,733,397 B2
(45) Date of Patent: Aug. 15, 2017

(54) ANTI-REFLECTION COAT AND OPTICAL DEVICE

(71) Applicant: Tamron Co., Ltd., Saitama-shi (JP)

(72) Inventors: Minoru Shibuya, Saitama (JP); Naoki Yamashita, Saitama (JP)

(73) Assignee: Tamron Co., Ltd., Saitama-Shi (JP)

( * ) Notice: Subject to any disclaimer, the term of this patent is extended or adjusted under 35 U.S.C. 154(b) by 905 days.

(21) Appl. No.: 13/727,023

(22) Filed: Dec. 26, 2012

(65) Prior Publication Data

US 2014/0009835 A1 Jan. 9, 2014

(30) Foreign Application Priority Data

Dec. 28, 2011 (JP) .................................. 2011-288153

(51) Int. Cl.
*G02B 1/111* (2015.01)
*B82Y 20/00* (2011.01)

(52) U.S. Cl.
CPC ............... *G02B 1/111* (2013.01); *B82Y 20/00* (2013.01); *Y10S 977/755* (2013.01)

(58) Field of Classification Search
CPC .. G02B 1/10; G02B 1/11; G02B 1/111; G02B 1/113; G02B 1/115; G02B 1/118
USPC ......... 359/577–590, 599, 601; 428/689, 446, 428/447, 448
See application file for complete search history.

(56) References Cited

U.S. PATENT DOCUMENTS

| | | | |
|---|---|---|---|
| 5,991,081 A * | 11/1999 | Haaland | C03C 17/225 359/580 |
| 2006/0154044 A1 | 7/2006 | Yamada et al. | |
| 2007/0030430 A1 | 2/2007 | Inoue et al. | |
| 2007/0247711 A1 | 10/2007 | Ohtani et al. | |
| 2008/0239488 A1* | 10/2008 | Asakura | G02B 1/111 359/485.01 |
| 2009/0220774 A1 | 9/2009 | Imai et al. | |
| 2010/0027123 A1* | 2/2010 | Imai | G02B 1/115 359/586 |

(Continued)

FOREIGN PATENT DOCUMENTS

| | | |
|---|---|---|
| CN | 1955765 A | 5/2007 |
| CN | 101010603 A | 8/2007 |

(Continued)

OTHER PUBLICATIONS

Tamada, T. et al., The development of high efficiency antireflection coating "Aero Bright Coating" using porous silica, Proceedings of the 35th Optical Symposium, Jul. 2010, pp. 67-70.

*Primary Examiner* — Kimberly N Kakalec
(74) *Attorney, Agent, or Firm* — The Webb Law Firm

(57) ABSTRACT

An anti-reflection coat includes an intermediate layer and a low refractive index layer sequentially stacked on a substrate, and preventing the reflection of incident light by optical interference effect, wherein the low refractive index layer is a film formed on the surface of the intermediate layer by a wet film formation method using a coating liquid including layer-constituting raw materials which includes hollow silica particles adhering each other with a binder, and the intermediate layer is a layer mainly composed of an organometallic compound which adheres well to the binder and having wettability to the coating liquid; and provides an optical device including the anti-reflection coat.

13 Claims, 7 Drawing Sheets

(56) References Cited

U.S. PATENT DOCUMENTS

| | | | | |
|---|---|---|---|---|
| 2010/0028682 A1* | 2/2010 | Shinohara | .............. | G02B 1/105 |
| | | | | 428/409 |
| 2010/0279088 A1* | 11/2010 | Naito | .................... | G02B 1/041 |
| | | | | 428/212 |
| 2011/0256405 A1 | 10/2011 | Taga | | |
| 2012/0251803 A1* | 10/2012 | Shibuya | ................... | G02B 1/11 |
| | | | | 428/212 |

FOREIGN PATENT DOCUMENTS

| | | | |
|---|---|---|---|
| CN | 102112303 | A | 6/2011 |
| JP | 2002-182007 | A | 6/2002 |
| JP | 2006215542 | A | 8/2006 |
| JP | 2007-052345 | A | 3/2007 |
| JP | 2008-046264 | A | 2/2008 |
| JP | 2009-237551 | A | 10/2009 |
| JP | 4378972 | B2 | 10/2009 |
| WO | 2007073007 | A1 | 6/2007 |

\* cited by examiner

ANTI-REFLECTION COAT AND OPTICAL DEVICE

BACKGROUND OF THE INVENTION

Field of the Invention

The present invention relates to an anti-reflection coat preventing the reflection of incident light by utilizing optical interference effect and an optical device provided with the anti-reflection coat.

Background Art

On the surface of the substrate of an optical device such as a lens or a prism constituting an optical apparatus, an anti-reflection coat is provided to enhance the optical transmittance. The anti-reflection coat reduces the reflection of incident light mainly utilizing optical interference effect. In an anti-reflection coat composed of a single layer, part of the incident light reflects at both the surface of the anti-reflection coat and the interface between the anti-reflection coat and the substrate. When the optical film thickness of the anti-reflection coat is quarter of the incident light wavelength (Lambda), the phase of the interface-reflected light is reversed in relation to the phase of the surface-reflected light, and due to the optical interference effect, the surface-reflected light and the interface-reflected light cancel each other. So, when the incident medium is air, the refractive index of the substrate is denoted by n(sub) and the refractive index of the anti-reflection coat is denoted by the square root of n(sub), reflectance of the incident light having the wavelength of $\lambda$ is made to be 0%. However, such an optical design can assure the low reflectance only in a narrow band (in the vicinity of the reference wavelength).

So, formation of a multilayer film composed of a plurality of layers having different refractive indexes is required to provide an anti-reflection coat effective in wide-band wavelength light. As a low refractive index layer provided at the interface between the multilayer film and the air, a vapor deposition film using an inorganic material is generally used; specifically, magnesium fluoride film having a refractive index of about 1.38 or silica film having a refractive index of about 1.49 are used. The performance of an anti-reflection coat is largely affected by the refractive index of the low refractive index layer provided at the interface with the air; i.e. the lower the refractive index, the higher the antireflection performance. However, as the materials which can be used in the vapor deposition method for film formation are limited, it has been difficult to achieve a further lower refractive index in a film formed by using a vapor deposition method. Then, materials for wet film formation method which contains air in the films have been developed in recent years, and low refractive index layers having a refractive index of 1.15 to 1.35 have been achieved by wet film formation method.

Further, most of conventional optical apparatuses have been used for light beams incident in specific narrow incident angle ranges. So, the optical design employed for an anti-reflection coats was excellent in antireflection effect in a specific incident angle range. However, depending on the miniaturization and high performance of lenses, lenses having wide aperture and large curvatures have been used in recent years. When a lens having a large curvature is used, the light beam incident angle range in the peripheral portion of the lens enlarges. Consequently, anti-reflection coat excellent in antireflection effect for light beams in the whole visible light region which incidents in a wider incident angle range is required.

From such a viewpoint described above, for example, Japanese Patent No. 4378972 (hereinafter; Patent Document 1) proposes an anti-reflection coat composed of a low refractive index layer having refractive index of 1.20 to 1.50 formed by a wet film formation method using a hollow fine particle. In Patent Document 1, a low refractive index is achieved by using a hollow fine particle as the film formation material and introduces voids in the layer. Patent Document 1 also states that the durability of the anti-reflection coat is enhanced by adhering hollow fine particles each other by a first binder followed by filling the voids between the hollow fine particles in a filling ratio of 40% or more by a second binder.

Next, Japanese Patent Laid-Open No. 2006-215542 (hereinafter; Patent Document 2) discloses an anti-reflection coat having a double layer structure including a dense layer and a porous silica aerogel layer sequentially provided in this order on a single layer substrate. In the anti-reflection coat disclosed in Patent Document 2, the surface-reflected light is canceled by utilizing the interface-reflected light generates at the interface between the individual layers by changing the refractive index in a smooth step-like manner from the substrate toward the medium in the optical film thickness direction, and even when the wavelength of the incident light is in a wide band and the incident angle of the incident light is over a wide range, excellent antireflection effect is achieved.

By the way, the low refractive index layer disclosed in Patent Document 1 and the porous silica aerogel layer disclosed in Patent Document 2 are both formed by a wet film formation method. However, the wet film formation method is hard to accurately form an anti-reflection coat on the surface of a lens, a curving surface. In particular, it is extremely difficult to accurately form an extremely thin anti-reflection coat on the surface of a lens having a large curvature. When surface defect such as micro-protrusions due to foreign matter or micro-recesses due to flaws on the surface of a lens exist, the unevenness in the film thickness generates over wide area from such defect sites. Consequently, the anti-reflection coat may have large quality deviation, poor antireflection performance or poor appearance.

Next, the anti-reflection coat disclosed in Patent Document 1 adopts a method for improving the durability by filling the voids between the hollow fine particles with the second binder. So, the higher the void fraction in the layer, the lower the refractive index but the more poor in the durability at the same time. On the other hand, the higher the filling ratio by the second binder, i.e. the lower the void fraction in the layer due to the second binder, durability might be enhanced but refractive index increases. As described above, as the refractive index and the durability are in a trade-off relation; it is difficult to achieve excellent antireflection performance because refractive index of the layer cannot be largely decreased to obtain a practically sufficient durability.

Moreover, in the anti-reflection coat disclosed in Patent Document 1, adhesion of the low refractive index layer to the substrate is not sufficiently investigated, and adhesion of the low refractive index layer to the substrate may be low. Patent Document 1 further discloses a structure in which the low refractive index layer is provided via a hard coat layer to enhance adhesion of the low refractive index layer to the substrate. However, as the hard coat layer is formed by a wet film formation method also, the hard coat layer uniform in thickness may hardly be formed on a lens having a large curvature. Further, in the anti-reflection coat disclosed in Patent Document 1, the hard coat layer does not perform as an optical interference layer. So, the anti-reflection coat disclosed in Patent Document 1 is equal to a single-layered optical interference layer, and as described above, when the wavelength of the incident light deviates from the design wavelength, or when the incident angle range of the incident light extends over a wide range, a problem such that no sufficient antireflection performance is achieved in the anti-reflection coat may arise.

Next, trade-off relation between the refractive index and the durability lies in the anti-reflection coat disclosed in Patent Document 2 also. That is, when a porous silica aerogel layer will be formed on the surface of a $SiO_2$ layer to have a refractive index of 1.15 as a dense layer, no practical durability is obtained due to the original property of silica aerogel. Further, it should be noted that silica aerogel changes its structure when moisture is adsorbed. Then, silica aerogel may be subjected to a hydrophobization treatment with a fluoride for preventing the adsorption of moisture, but the treatment increases refractive index of the porous silica aerogel layer. So, it has been reported that, for example, when silica aerogel particles which adhere each other by using a binder in the formation of the porous silica aerogel layer, refractive index should be about 1.25 to achieve practical durability (see, for example, "Proceedings of 35th Optical Symposium" under the auspices of the Optical Society of Japan, an affiliate of the Japan Society of Applied Physics, July 2010, pp. 67-70). Further, it has also been reported that when the anti-reflection coat having a refractive index about 1.25 is subjected to a high-temperature high-humidity test (60° C., 90% RH), reflectance increases by about 0.2%.

SUMMARY OF THE INVENTION

So, an object of the present invention is to provide an anti-reflection coat in which a low refractive index layer is excellent in film formability, adhesion and durability; and having excellent antireflection performance and an optical device.

The present inventors have solved the problems by adopting the anti-reflection coat and the optical device described later after a diligent study.

The anti-reflection coat according to the present invention is an anti-reflection coat comprising an intermediate layer and a low refractive index layer sequentially stacked on a substrate, and preventing the reflection of incident light by optical interference effect, wherein the low refractive index layer is a layer including hollow silica particles adhering each other with a binder formed on the surface of the intermediate layer by a wet film formation method using a coating liquid including layer-constituting raw materials, and the intermediate layer is a layer mainly composed of an organometallic compound which adheres well to the binder and having wettability to the coating liquid.

In the present invention, the intermediate layer is preferably an organosilicon compound layer mainly composed of an organosilicon compound.

In the present invention, the intermediate layer is preferably a layer mainly composed of an organotitanium compound or an organozirconium compound.

In the present invention, the intermediate layer is preferably a layer composed of a self-assembled monomolecular film.

In the present invention, the intermediate layer is preferably a layer formed by a vacuum film formation method or a wet film formation method.

In the present invention, when the refractive index of the low refractive index layer is denoted by n(1) and the refractive index of the substrate is denoted by n(sub), the refractive index of the intermediate layer denoted by n(2) preferably satisfies the relation represented by the following formula (1):

[Expression 1]

$$n(1) \times \sqrt{n(sub)} \times 0.930 \leq n(2) \leq n(1) \times \sqrt{n(sub)} \times 0.985 \quad (1)$$

Wherein; $1.15 \leq n(1) \leq 1.24$

In the present invention, the anti-reflection coat preferably further comprises an inorganic base layer as an optical interference layer, composed of an inorganic material, between the substrate and the intermediate layer. In the present case, the refractive index n(2) of the intermediate layer is not required to satisfy the described above formula (1).

In the present invention, the inorganic base layer is preferably a single layer film composed of a transparent inorganic material having a refractive index of 1.35 or more and 2.5 or less, or a multilayer film comprising a plurality of thin stacked layers composed of the transparent inorganic material.

In the present invention, the surface of the intermediate layer is preferably subjected to a surface treatment for improving the wettability to the coating liquid.

In the present invention, preferably, the average particle size of the hollow silica particle is 5 nm or more and 100 nm or less, the hollow silica particles are adhering each other by the binder, in the state that the outside of the hollow silica particles is coated with the binder, and void portions other than the hollow portions in the hollow silica particles are present in the low refractive index layer, and the refractive index of the low refractive index layer is 1.15 or more and 1.24 or less.

In the present invention, the anti-reflection coat preferably further comprises a functional layer having a refractive index of 1.30 or more and 2.35 or less and having a physical thickness of 1 nm or more and 30 nm or less on the surface of the low refractive index layer.

In the present invention, it is preferable that reflectance of the light in wavelength band of 400 nm to 700 nm incident at an incident angle of 0 degree is 0.5% or less, and reflectance of the light in wavelength band of 400 nm to 700 nm incident at an incident angle of 0 degree or more and 45 degrees or less is 1.0% or less.

In the present invention, the substrate is preferably an optical device substrate.

The optical device according to the present invention is characterized in comprising the anti-reflection coat.

According to the present invention, the low refractive index layer is formed well on the surface of the intermediate layer by a wet film formation method and the low refractive index layer adheres well to the substrate via the intermediate layer because the intermediate layer which has wettability to the coating liquid used when the low refractive index layer is formed and is mainly composed of an organometallic compound which adheres well to the binder is provided on the substrate. Further, the hollow silica particles which adheres well to the intermediate layer via the binder, and hence the detachment or the like of the low refractive index layer caused by the dropout of the hollow silica particles or the like is prevented, and an anti-reflection coat having excellent appearance can be manufactured. Next, the hollow silica particle constituting the low refractive index layer is a material excellent in durability and stability, and hence the durability and the stability of the anti-reflection coat are made excellent. Moreover, the anti-reflection coat according to the present invention exhibits excellent antireflection performance for the light beam in a wide wavelength band and a wide incident angle range because the interface-reflected light occurring at the interface between the individual layers or the interface with the substrate is utilized.

DETAILED DESCRIPTION OF THE PREFERRED EMBODIMENTS

Figure 1:
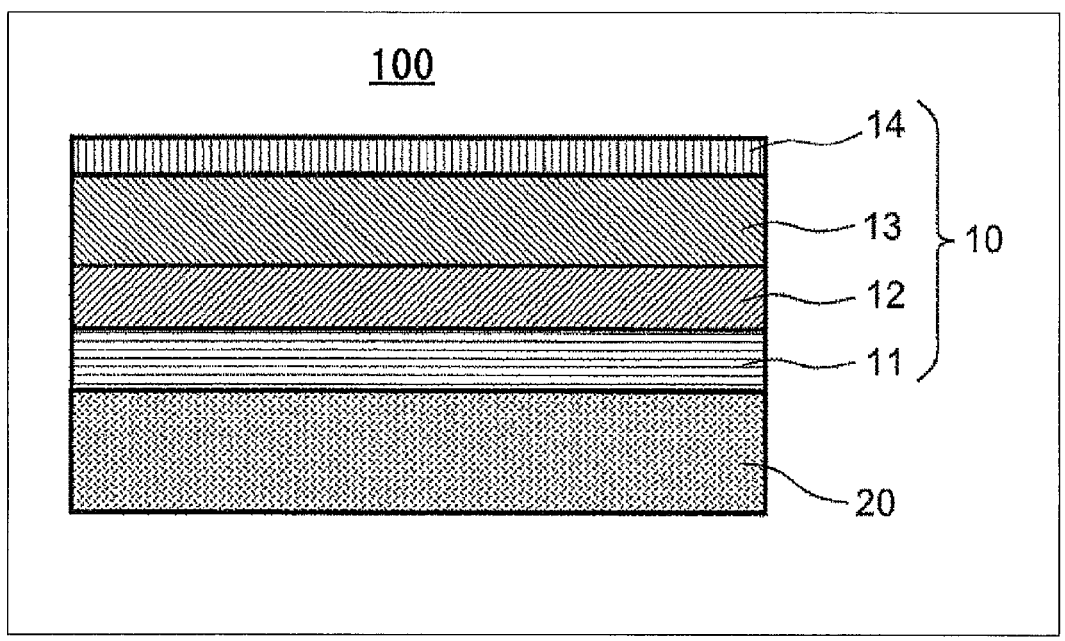
FIG. 1 is a schematic view illustrating layer structure of an anti-reflection coat according to the present invention.

Hereinafter, embodiments of the anti-reflection coat and the optical device according to the present invention will be described with reference to FIGS. 1 and 2.

1. Anti-Reflection Coat 10

First, the anti-reflection coat 10 according to the present invention will be described. The anti-reflection coat 10 according to the present invention comprises an intermediate layer 12 and a low refractive index layer 13 sequentially stacked on a substrate 20, and prevents the reflection of incident light by optical interference effect. As shown in FIG. 1, an inorganic base layer 11 is provided between the substrate 20 and the intermediate layer 12. In the present invention, the low refractive index layer 13 has a structure in which the hollow silica particles 131 which adhere each other by the binder 132 as shown in FIGS. 2(a) and 2(b). In the present invention, film formability and adhesion to the substrate 20 of the low refractive index layer 13 formed by a wet film formation method are enhanced because the intermediate layer 12 mainly composed of an organometallic compound which adheres well to the binder 132 and has wettability to the coating liquid used when the low refractive index layer 13 is formed is provided on the substrate 20; and the low refractive index layer 13 is formed on the surface of the intermediate layer 12. Hereinafter, the substrate 20 and the individual layers constituting the anti-reflection coat 10 are described one by one.

(1) Substrate 20

First, the substrate 20 on which the anti-reflection coat 10 is provided will be described. In the present invention, an optical device substrate can be used as the substrate 20 on which the anti-reflection coat 10 is provided. The optical device substrate may be made of glass or plastics, but the material is not particularly limited. For example, the various optical substrates 20 including lenses, prisms (such as color separation prisms and color synthesis prisms), polarized beam splitters (PBSs), cut filters (such as for infrared ray and for ultraviolet ray) can be used. In the present invention, the low refractive index layer 13 can be formed well even on a substrate such as a small size lens having a large curvature, and adhesion of the low refractive index layer 13 is made excellent even when a wet film formation method is used because the low refractive index layer 13 is provided on the surface of the intermediate layer 12 as described above. So, a small size lens can be used well as the substrate 20.

(2) Inorganic Base Layer 11

Next, the inorganic base layer 11 will be described. In the present invention, the inorganic base layer 11 is provided between the substrate 20 and the intermediate layer 12 as described above. The inorganic base layer 11 is a layer made of an inorganic material and functions as an optical interference layer. The optical interference layer is an optical thin film optically designed to make the refractive index and the optical film thickness in the predetermined values based on the characteristic matrix of a thin film to achieve a predetermined value of the phase change of the interface-reflected light in relation to the incident light.

As the inorganic material, a transparent inorganic material having a refractive index of 1.35 or more and 2.5 or less is preferably used. Such a transparent inorganic material include: $Al_2O_3$, $ZrO_2+Al_2O_3$, SiN, SiC, SiO, MgO, $La_2O_3+Al_2O_3$, $Y_2O_3$, $In_2O_3+SnO_2$, $La_2Ti_2O_7$, $SnO_2$, $Ta_2O_5$, $HfO_2$, $ZrO_2$, $CeO_2$, $WO_3$, $ZrO_2+TiO_2$, $Ta_2O_5$, $Ta_2O_5+ZrO_2$, $Ta_2O_5+TiO_2$, $Ti_3O_5$, $Ti_4O_7$, $TiPr_6O_{11}+TiO_2$, TiO, $TiO_2$, $Nb_2O_5$, $TiO_2+La_2O_3$, $Pr_6O_{11}+TiO_2$, $SiO_2$, $SiO_xN_y$, $CeO_2$, $MgF_2$, ZnS and $YF_3$.

The inorganic base layer 11 is preferably a single layer film or a multilayered film prepared by stacking one or more sub-layers (thin layers) made of an inorganic material. Note that the sub-layer is a physical single layer constituting the inorganic base layer 11. In the present invention, reflectance of the anti-reflection coat 10 is made extremely low by making a structure of the inorganic base layer 11 one layer or stacked sub-layers where each sub-layer functions as an optical interference layer.

The optical design (design of refractive index and optical film thickness) of each layer can be performed on the basis of the matrix method in the same manner as in the design of the usual anti-reflection coat even when the inorganic base layer 11 is a single layer film or a multilayer film. An anti-reflection coat 10 having a higher antireflection performance is obtained by increasing the number of stacked sub-layers constituting the inorganic base layer 11.

The optical film thickness of each sub-layer is preferably set at 150 nm or less to obtain an anti-reflection coat 10 having a lower reflectance in a wider wavelength band. The optical film thickness of each sub-layer exceeds 150 nm is not preferable because low average reflectance in the anti-reflection coat 10 may hardly be maintained depending on the design including a large number of unnecessary ripples.

It is preferable to use a vacuum film formation method in formation of the inorganic base layer 11 (individual sub-layers). When the inorganic base layer 11 will be formed on the surface of the substrate 20 by the vacuum film formation method, the inorganic base layer 11 strongly adheres to the surface of the substrate 20. As the vacuum film formation method, either of a physical vapor deposition method and a chemical vapor deposition method can be suitably used. The physical vapor deposition method include a vacuum vapor deposition method, a sputtering method, an ion plating method and an ion beam vapor deposition method. The chemical vapor deposition method includes the CVD method (inclusive of a plasma CVD method). Among these methods, in particular, the vacuum vapor deposition method, the sputtering method and the CVD method can be suitably used. By using these methods, an inorganic base layer 11 (or sub-layers) having a physical film thickness of 1 nm or more and 150 nm or less is accurately formed.

(3) Intermediate Layer 12

Next, the intermediate layer 12 will be described. The intermediate layer 12 is a layer mainly composed of an organometallic compound which adheres well to the binder 132 which is one of the layer-constituting raw materials of the low refractive index layer 13, and having wettability to the coating liquid including the layer-constituting raw materials of the low refractive index layer 13 (the hollow silica particle 131 and the binder 132).

Note that, the organometallic compound is a compound including at least one metal-carbon bond in the molecule, i.e. the metal and an organic group are bonded each other by a direct metal-carbon bond. Next, the organometallic compound which adheres well to the binder 132 includes an organometallic compound having an organic group which adheres well to the binder 132; specifically, an organometallic compound having the following organic groups: alkyl groups such as a methyl group, an ethyl group, an n-propyl group, an isopropyl group, a butyl group, an isobutyl group, a tert-butyl group, a hexyl group, a cyclohexyl group, an octyl group, a norbornyl group and an isonorbornyl group; alkenyl groups such as a vinyl group, an allyl group, a propenyl group and a butenyl group; aryl groups such as a phenyl group and a tolyl group; aralkyl groups such as benzyl group and a phenylethyl group; alkoxy groups such as a methoxy group, an ethoxy group, a propoxy group, an isopropoxy group, a butoxy group, an isobutoxy group and a tert-butoxy group; and other groups such as an amide group, an imide group, a nitrile group, a carbonyl group, a carboxyl group and a hydroxy group. Further, these organic groups may be chemically bonded (cross-linking polymerized) each other to form a polymer net-like structure in the intermediate layer 12 having these organic groups.

In the present invention, the intermediate layer 12 is required to adhere well to the inorganic base layer 11 or the substrate 20, and not to exhibit optically strong absorption in the visible light band. From these viewpoints, the preferable metal element contained in the organometallic compound constituting the intermediate layer 12 include the group 2 metal elements (Mg, Ca, Ba), the group 3 metal element (Y), lanthanoids (La, Ce, Pr), the group 4 metal elements (Ti, Zr, Hf), the group 5 metal elements (Ta, Nb), and may be base metals such as In, Ga and Sn, and may be Si, a semiconductor element. Note that Si is not a metal in strict sense, but the organosilicon compounds are generally classified to be organometallic compounds. So, in the present invention, the compounds composed of the organic groups and the elements (metal elements) described above are referred to as organometallic compounds.

In the present invention, from the viewpoint of obtaining an intermediate layer 12 having excellent wettability to the coating liquid, the organometallic compound constituting the intermediate layer 12 is preferably an organosilicon compound or an organometallic compound containing a group 4 metal element, and more preferably an organosilicon oxide or an organometallic oxide containing a group 4 metal element. The organometallic compounds have excellent wettability to the coating liquid as materials themselves, or the wettability of the intermediate layer 12 to the coating liquid is enhanced by subjecting the surface treatment described below after formation of the intermediate layer 12.

The matter that the intermediate layer 12 has excellent wettability to the coating liquid is that the contact angle of the coating liquid to the intermediate layer 12 is less than 45'; the lower the contact angle, the better the coating liquid makes wet the surface of the intermediate layer 12; ant it makes formed low refractive index layer 13 uniform without speckles on the surface of the intermediate layer 12. At the same time, adhesion between the intermediate layer 12 and the low refractive index layer 13 is made better. From such viewpoint, the contact angle is preferably 30° or less, more preferably 10° or less and furthermore preferably 5° or less.

Next, the intermediate layer 12 is preferably subjected to a surface treatment for improving the wettability to the coating liquid. By subjecting the intermediate layer 12 to the surface treatment, the wettability of the coating liquid to the intermediate layer 12 is made better. Specifically, the wettability of the surface of the intermediate layer 12 is enhanced by subjecting the intermediate layer 12 to surface treatment such as plasma treatment or UV cleaning treatment.

For example, when the intermediate layer 12 will be formed by using a vacuum film formation method, a method in which the surface of the intermediate layer 12 is irradiated with plasma by using as treatment gas such as argon gas, hydrogen gas, helium gas or oxygen gas, without leaking the chamber may be applicable. The method is preferable because the surface treatment can be performed immediately after the film formation by using the vacuum film formation apparatus used for forming the intermediate layer 12.

Alternatively, the wettability of the intermediate layer 12 may also be improved after the formation of the intermediate layer 12 by post-treatment such as atmospheric pressure plasma treatment or UV cleaning treatment. For example, when the intermediate layer 12 will be formed by a wet film formation method in which no pressure reduction apparatus is required, it is preferable to subject the intermediate layer 12 to surface treatment by using atmospheric pressure plasma treatment or UV cleaning treatment.

Note that the contact angle of the coating liquid to the intermediate layer 12 with or without the surface treatment is preferable to be in the range described above.

Next, the physical film thickness of the intermediate layer 12 will be described. The physical film thickness of the intermediate layer 12 is preferably 1 nm or more and 150 nm or less. When the physical film thickness of the intermediate layer 12 is less than 1 nm, it is difficult to form the intermediate layer 12 uniformly without unevenness on such a concave/convex surface when a lens or the like having a concave/convex surface is used as the substrate 20. Consequently, the formation of the low refractive index layer 13 on the surface of the intermediate layer 12 is made difficult, and it makes adhesion of the low refractive index layer 13 to the surface of the substrate 20 via the intermediate layer 12 difficult. Note that the matter is not applied to the self-assembled monomolecular film (SAM film) described later because the self-assembled monomolecular film can coat the surface uniformly as a monomolecular layer. On the other hand, when the physical film thickness of the intermediate layer 12 exceeds 150 nm, it makes a film design which satisfies the optical properties required for the intermediate layer 12 as an optical interference layer difficult. In other words, it is not preferable because an optical design of the anti-reflection coat 10 in which phase change described above taking an appropriate value is made difficult; and consequently, the antireflection performance of the anti-reflection coat 10 may be made poor. From such viewpoint, the physical film thickness of the intermediate layer 12 is more preferably 120 nm or less and furthermore preferably 100 nm or less.

The refractive index of the intermediate layer 12 is preferably in a range of 1.30 or more and 2.35 or less. When an organometallic compound film constitutes the intermediate layer 12, the refractive index of the intermediate layer 12 might be in the range described above. When the physical film thickness of the intermediate layer 12 is 30 nm or less, the refractive index of the intermediate layer 12 may be any value in the range described above because the intermediate layer 12 may not affect the optical properties of the anti-reflection coat 10.

On the other hand, when the intermediate layer 12 functions as an optical interference layer, the refractive index n(2) of the intermediate layer 12 is preferable to satisfy the relation represented by the following formula (1) when the refractive index of the low refractive index layer 13 is denoted by n(1) and the refractive index of the substrate 20 is denoted by n(sub).

[Expression 2]

$$n(1) \times \sqrt{n(\text{sub})} \times 0.930 \leq n(2) \leq n(1) \times \sqrt{n(\text{sub})} \times 0.985 \quad (1)$$

Wherein; $1.1.5 \leq n(1) \leq 1.24$

When the refractive index n(2) of the intermediate layer 12 is in the range described above according to the refractive index n(sub) of the substrate 20 and the refractive index n(1) of the low refractive index layer 13, the antireflection performance of the anti-reflection coat 10 is extremely excellent even when the optical layer structure of the anti-reflection coat 10 is a two-layer structure composed of the intermediate layer 12 and the low refractive index layer 13. Note that when the anti-reflection coat 10 comprises the inorganic base layer 11, the refractive index and the film thickness of the intermediate layer 12 are preferable to be appropriately designed according to the matrix method (the optical properties are designed).

Next, the film formation method of the intermediate layer 12 will be described. The method for forming the intermediate layer 12 is not particularly limited. For example, the methods such as the vacuum film formation method and the wet film formation method can be suitably used as described above.

1) Vacuum Film Formation Method

As the vacuum film formation method, the same manner as in the method described on formation of the inorganic base layer 11 can be used. When the method described above is used, the control of the film thickness is easy, and the physical film thickness of the intermediate layer 12 formed is made accurate to make the physical film thickness of the intermediate layer 12 1 nm or more and 150 nm or less. So, when the intermediate layer 12 functions as an optical interference layer as described above, the vacuum film formation method is preferably used from the viewpoint that the film thickness of the intermediate layer 12 can be accurately controlled.

In the present invention, the chemical vapor deposition method (CVD method) is most preferably used when the intermediate layer 12 will be formed by the vacuum film formation method. The chemical vapor deposition method is a method for forming a thin film on the surface of a substrate placed in the chamber by chemical reaction in the vapor phase or at the surface of the substrate through the process in which the compounds containing the constituent elements of the thin film-constituting raw materials (the components constituting the intermediate layer 12) are made into a raw material gas, and the resulting raw material gas is introduced into the chamber. In the present invention, the compounds containing the constituent elements of the targeted organometallic compound as the thin film-constituting material are made into a raw material gas. When the CVD method is used, even when compounds containing no oxygen are used as the thin film-constituting materials, a layer mainly composed of an organometallic oxide is formed by performing the film formation while introducing oxygen gas. Further, the refractive index of the intermediate layer 12 can be changed by appropriately arranging the film formation conditions even when the same film-constituting materials are used, for example, appropriately changing the amount of the introduced oxygen gas in relation to the raw material gas. When the intermediate layer 12 functions as an optical interference layer, the chemical vapor deposition method is preferably used because the film thickness and the refractive index can be easily controlled.

When the intermediate layer 12 will be formed by the chemical vapor deposition method, it is particularly preferable to use the plasma CVD method. When the plasma CVD method is used, the surface of the intermediate layer 12 is irradiated with plasma after the formation of the intermediate layer 12 without leaking of the chamber, and thus the wettability of the surface of the intermediate layer 12 is improved as described above; i.e. the intermediate layer 12 having good wettability is efficiently formed.

The following materials can be used as the layer-constituting raw materials when the intermediate layer 12 mainly composed of an organometallic compound will be formed by the plasma CVD method.

When the intermediate layer 12 mainly composed of an organosilicon compound will be formed, the compounds containing the constituent elements of the organosilicon compound are used as the thin film-constituting raw materials. Specifically, the thin film-constituting raw materials include alkoxysilane, alkylsilazane and alkylsilane. Specifically, alkylsilanes include tetramethylsilane (TMS); alkoxysilanes include hexamethyldisiloxane (HMDSO) and tetraethoxysilane (TEOS); and alkylsilazanes include hexamethyldisilazane (HMDS). Further, another available thin film-constituting materials include trimethoxysilane, tripropoxysilane, tributoxysilane, methyldimethoxysilane, methyldiethoxysilane, methyldipropoxysilane, methyldibutoxysilane, ethyldimethoxysilane, ethyldiethoxysilane, ethyldipropoxysilane, ethyldibutoxysilane, propyldimethoxysilane, propyldiethoxysilane, propyldipropoxysilane, propyldibutoxysilene, propyldimethoxysilane, i-propyldiethoxysilane, propyldipropoxysilane, i-propyldibutoxysilene, butyldimethoxysilane, butyldiethoxysilane, butyldipropoxysilane, butyldibutoxysilane, butyldimethoxysilane, i-butyldiethoxysilane, butyldipropoxysilane, i-butyldibutoxysilane, s-butyldimethoxysilane, s-butyldiethoxysilane, s-butyldipropoxysilane, s-butyldibutoxysilane, phenyldimethoxysilane, phenyldiethoxysilane, phenyldipropoxysilane, phenyldibutoxysilane, dimethylmethodysilane, dimethylethoxysilane, dimethylpropoxysilane, dimethylbutoxysilane, methylethylmethoxysilane, methylethylethoxysilane, methylethylpropoxysilane, methylethylbutoxysilane, diethylmethoxysilane, diethylethoxysilane, diethylpropoxysilane, diethylbutoxysilane, methylpropylmethoxysilane, methylpropylethoxysilane, methylpropylpropoxysilane, methylpropylbutoxysilane, dipropylmethoxysilane, dipropylethoxysilane, dipropylpropoxysilane and dipropylbutoxysilane. When the intermediate layer 12 will be formed on the substrate 20 (or on the inorganic base layer 11) by using these thin film-constituting raw materials by the CVD method while introducing oxygen gas for example, the intermediate layer 12 mainly composed of an organosilicon oxide is formed.

For example, when a film will be formed by the CVD method using hexamethyldisiloxane as the thin film-constituting raw material (raw material gas), an organosilicon oxide film having a refractive index in a range of 1.4 or more and 1.65 or less is formed depending on the factors including the amount of the introduced oxygen gas. For example, the intermediate layer 12 having a refractive index in the range satisfying the formula (1) described above is formed when the refractive index of the low refractive index layer 13 is in a range of 1.17 or more and 1.24 or less. Further, the contact angle on the surface of the intermediate layer 12 described above is stably maintained when hexamethyldisilazane is used as a raw material gas, and the wettability to the coating liquid is made extremely excellent. So, it is preferable because film formability and adhesion of the low refractive index layer 13 are made better.

When the intermediate layer 12 mainly composed of an organometallic compound including a group 4 metal element will be formed, compounds containing the constituent elements of the organometallic compounds including a group 4 metal elements can be used as the thin film-constituting raw materials described above. Specifically, organometallic compounds including an organotitanium compound and an organozirconium compound, and an organotitanium oxide and an organozirconium oxide are preferably used. For example, the intermediate layer 12 mainly composed of an organotitanium compound is formed when a layer-constituting raw material including titanium isopropoxide (TPT), tetraproxytitanium, or organic titanium manufactured by Matsumoto Pharmaceutical Manufacture Co., Ltd. are used. In the present case, an intermediate layer composed of an organotitanium compound having a refractive index of 1.7 or more and 2.25 or less is formed by performing heat treatment after the film formation depending on the heat treatment conditions and the like. Further, the intermediate layer 12 mainly composed of an organozirconium compound is formed by using a layer-constituting raw material including organic zirconia manufactured by Matsumoto Pharmaceutical Manufacture Co., Ltd. and equivalents 2) Wet Film Formation Method Next, the wet film formation method will be described. When the wet film formation method is used for formation of the intermediate layer 12, the methods including a dip coating method, a spin coating method, a spray coating method, a roll coating method and a screen printing method can be used. According to the factors including the shape of the substrate 20 and the film thickness to be formed, suitable methods is appropriately used. As for these methods, popular methods and the like are appropriately used. The intermediate layer 12 composed of an organosilicon compound is obtained by using, for example, the following compounds; ethyltrimethoxysilane, methyltrimethoxysilane, methyltriethoxysilane, hexyltrimethoxysilane, octadecyltrimethoxysilane, octadecyltriethoxysilane, vinyltrimethoxysilane, vinyltriethoxysilane, phenyltrimethoxysilane, phenyltriethoxysilane, 3-aminopropyltriethoxysilane, 3-methacryloxypropyltrimethoxysilane, 3-methacryloxypropyltriethoxysilane, N-(2-aminoethyl)-3-aminopropylltrimethoxysilane, 3-chloropropyltrimethoxysilane, 3-(N,N-diglycidyl)aminopropyltrimethoxysilane, 3-glycidoxypropyltrimethoxysilane, dimethyldimethoxysilane, dimethyldiethoxysilane, diphenyldimethoxysilane, diphenyldiethoxysilane, methylphenyldimethoxysilane, methylvinyldimethoxysilane, methylvinyldiethoxysilane, 3-glycidoxypropylmethyldimethoxysilane, 3-aminopropylmethyldimethoxysilane, N-(2-aminoethyl)-3-aminopropylmethyldimethoxysilane, 3-chloropropylmethyldimethoxysilane, 3-chloropropylmethyldiethoxysilane, cyclohexylmethyldimethoxysilane, heptadecafluorodecylmethyldimethoxysilane, 3-methacryloxypropyldimethoxysilane and octadecylmethyldimethoxysilane.

In the present invention, it is also preferable to form the intermediate layer 12 as a self-assembled monomolecular film composed of an organometallic compound. The self-assembled monomolecular film is a monomolecular film chemically bonded to the film-forming surface of the material to which film is formed. In the film, molecules are adsorbed in dense to the film-forming surface due to the intermolecular interaction effect and the molecular orientations are uniform. For example, such a self-assembled monomolecular film is formed by a wet film formation method such as a dip coating method.

The thickness of the self-assembled monomolecular film is almost same as the monomolecular length of the organometallic compound constituting the intermediate layer 12, and thus the thickness of the self-assembled monomolecular film is uniform. So, by forming the intermediate layer 12 as a self-assembled monomolecular film, a film accurate and uniform in thickness of the intermediate layer 12 is formed stably with good reproducibility. Further, film formability of the low refractive index layer 13 is improved and the poor appearance caused by the surface defects is prevented because the wettability to the coating liquid in both the intermediate layer 12 and the low refractive index layer 13 are enhanced.

As described above, an intermediate layer 12 having a uniform film thickness without influence of the shape of the substrate 20 is formed because the film thickness of the self-assembled monomolecular film is almost same as the monomolecular length of the organometallic compound constituting the intermediate layer 12. For example, the length of an octadecyl group formed of a linear chain including 18 carbon atoms is 2.5 nm. In the present case, an intermediate layer 12 having a uniform thickness of 2.5 nm which follows the shape of the substrate 20 is formed. When the intermediate layer 12 is formed as such an extremely thin layer, the intermediate layer 12 hardly affects the optical properties of the anti-reflection coat 10. In other words, function of the intermediate layer 12 as the optical interference layer can be neglected in the present case. So, it is not required to optically design the intermediate layer 12 depending to factors such as the type of the substrate 20 or the antireflection performance required. Thus, the step of forming the intermediate layer 12 can be made common independent from the types of the lenses even when many different types of lenses are manufactured, for example.

The material which enables formation of a self-assembled monomolecular film composed of an organometallic compound with a wet film formation method include: hexamethyldisilazane, trichlorooctadecylsilane, SAMLAY (registered trademark) manufactured by Nippon Soda Co., Ltd. and OSRA (registered trademark) manufactured by Tokyo Ohka Kogyo Co., Ltd. In addition to the materials, a self-assembled monomolecular film will be formed by using the materials including trichloroalkylsilane or alkylsilanol. A self-assembled monomolecular film of an organosilicon compound is formed with a wet film formation method such as a dip coating method or a spin coating method by using these materials. Hexamethyldisilazane or OSRA will form a self-assembled monomolecular film by a vapor deposition method.

3) Others

When the intermediate layer 12 will be formed, other methods other than those described above can also be appropriately used. The intermediate layer 12 may also be formed by using the method based on thermal hydrolysis or an atomic layer deposition apparatus (ALD apparatus).

(4) Low Refractive Index Layer 13

Next, the low refractive index layer 13 will be described. As already described, the low refractive index layer 13 is a layer formed on the intermediate layer 12 by a wet film formation method, and a layer includes hollow silica particles 131 adhering each other with a binder 132.

Figure 2:
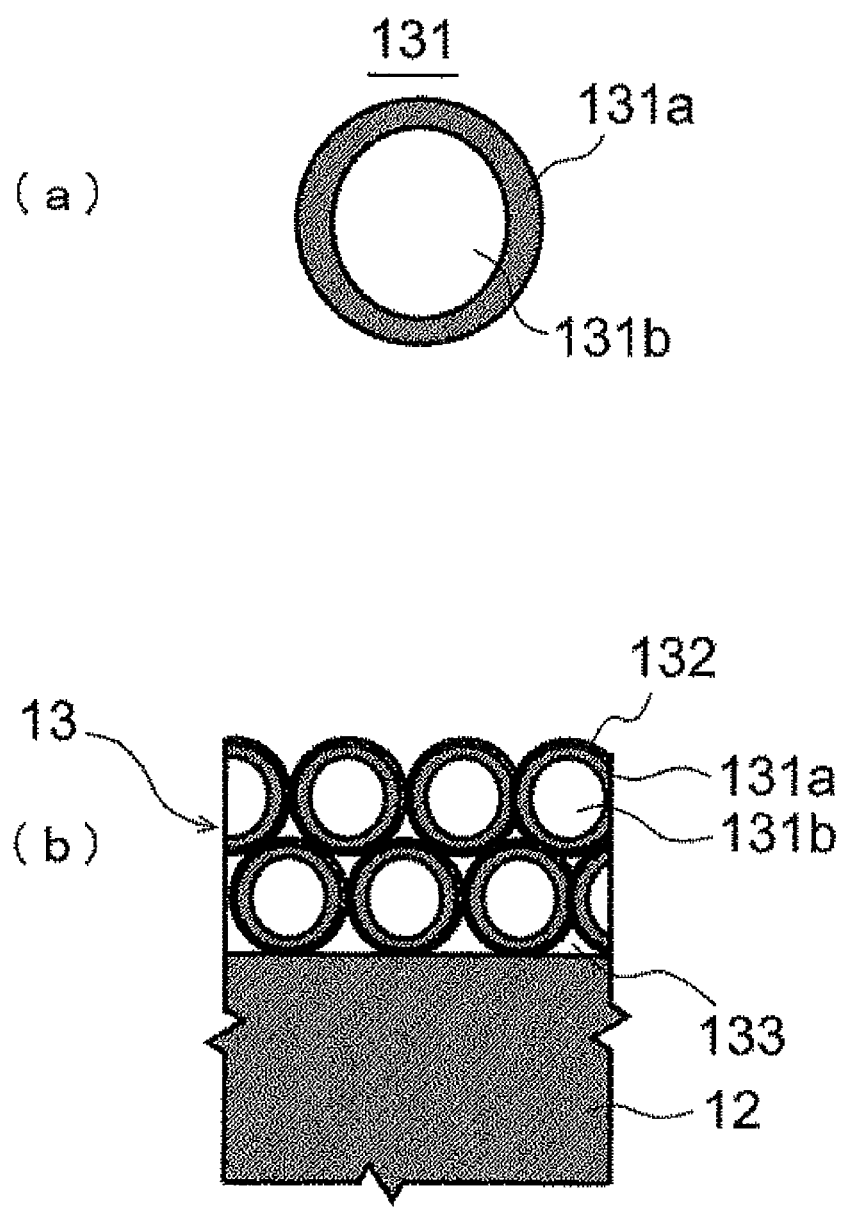
FIG. 2 is schematic views (a) and (b); (a) illustrates the structure of hollow silica, a constituent material of a low refractive index layer; and (b) illustrates the structure of the low refractive index layer.
Figure 3:
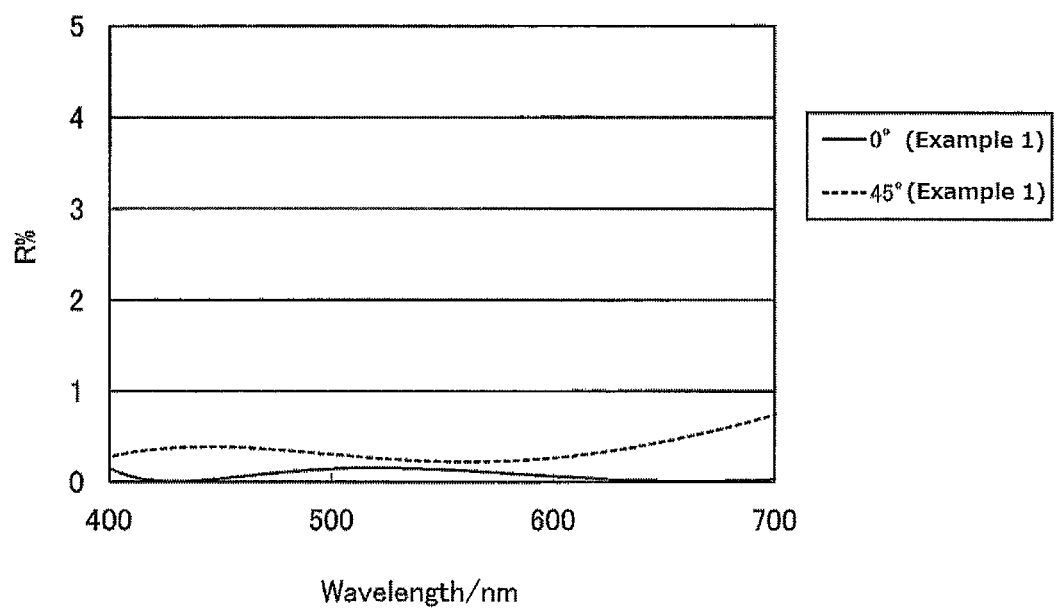
FIG. 3 is a graph showing the reflection property of the anti-reflection coat prepared in Example 1.
Figure 4:
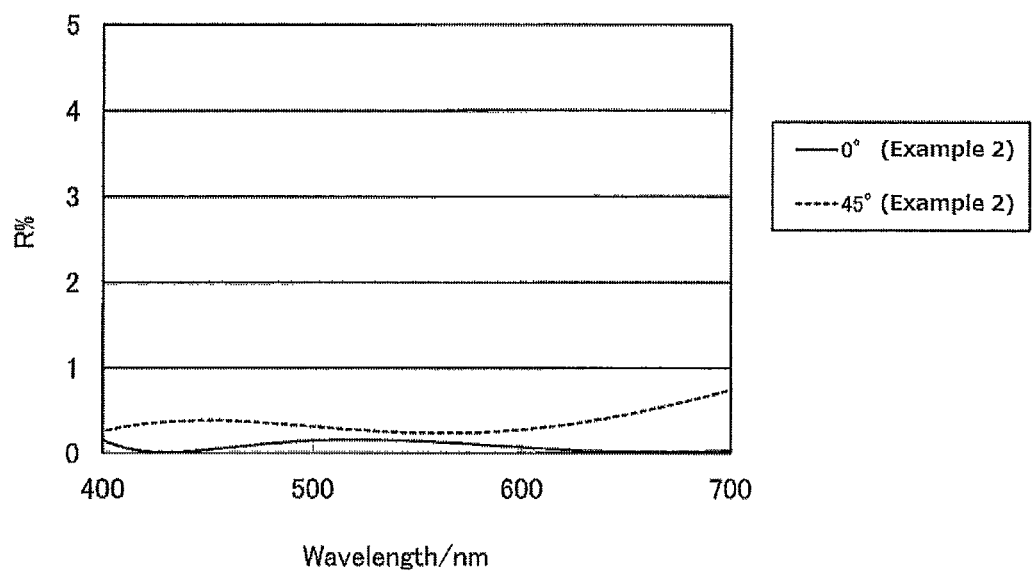
FIG. 4 is a graph showing the reflection property of the anti-reflection coat prepared in Example 2.
Figure 5:
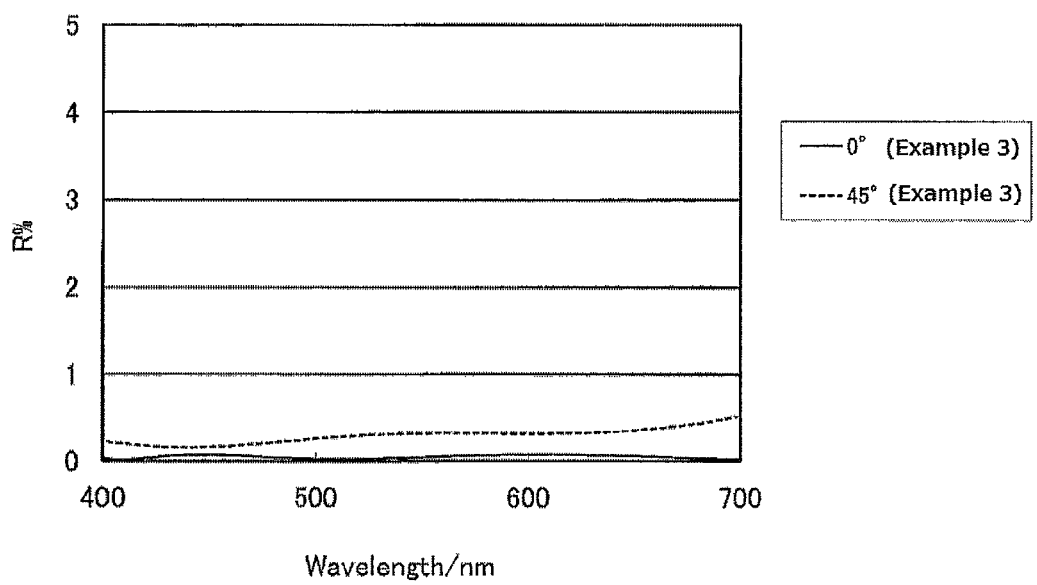
FIG. 5 is a graph showing the reflection property of the anti-reflection coat prepared in Example 3.
Figure 6:
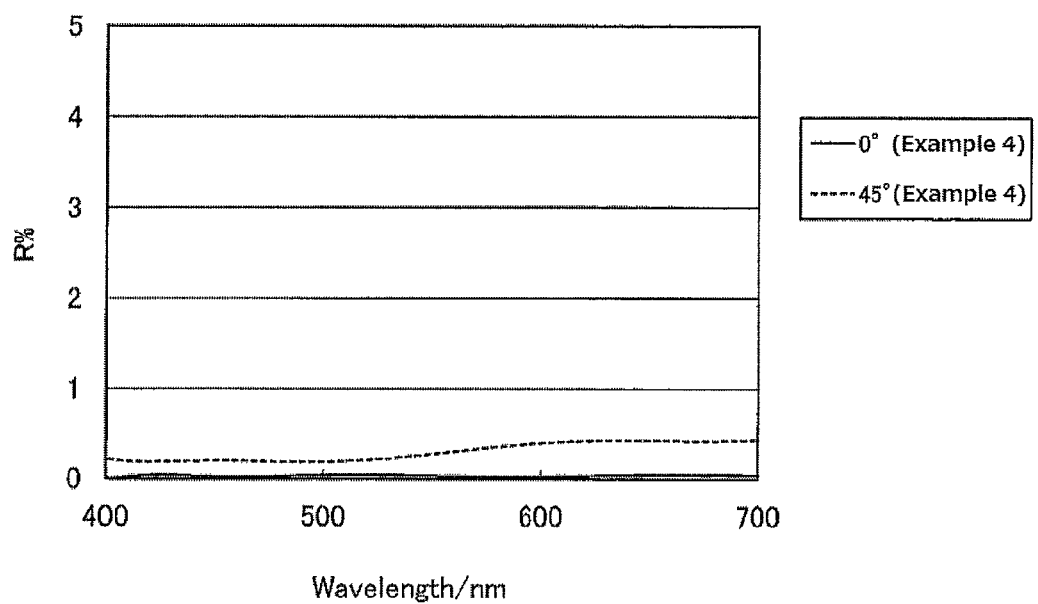
FIG. 6 is a graph showing the reflection property of the anti-reflection coat prepared in Example 4.
Figure 7:
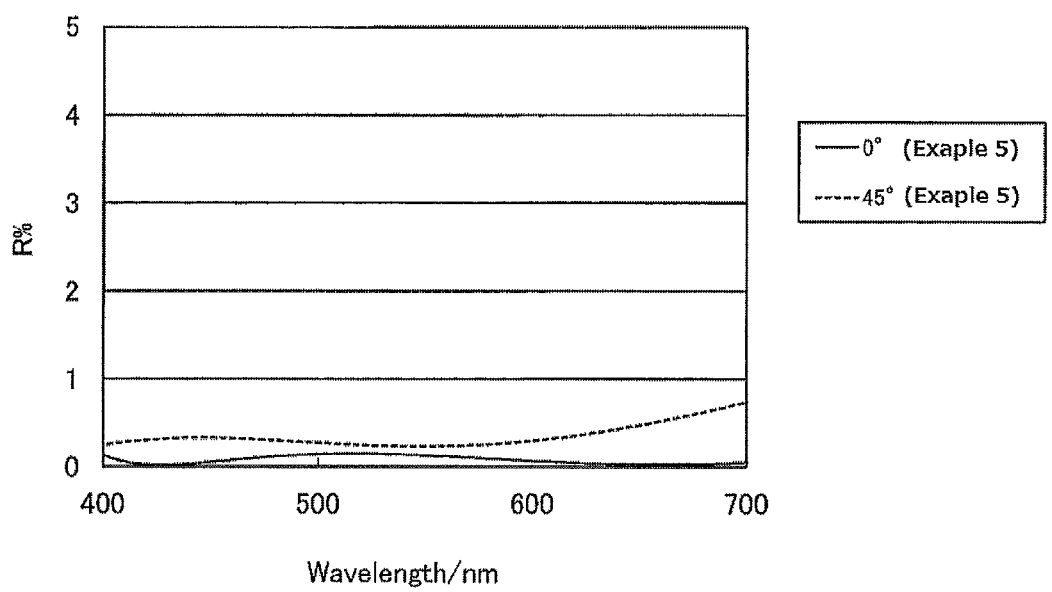
FIG. 7 is a graph showing the reflection property of the anti-reflection coat prepared in Example 5.
Figure 8:
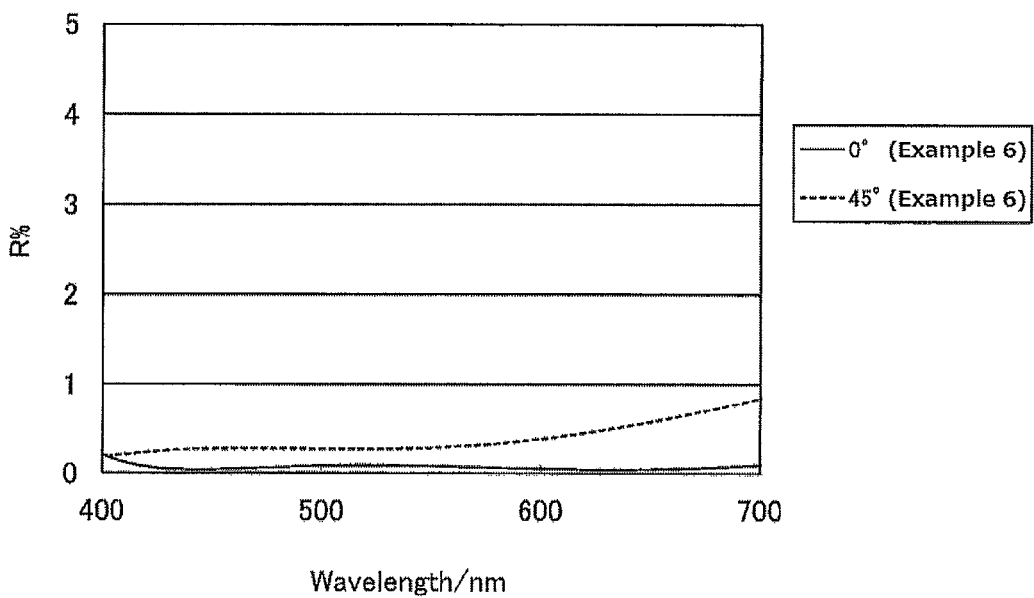
FIG. 8 is a graph showing the reflection property of the anti-reflection coat prepared in Example 6.
Figure 9:
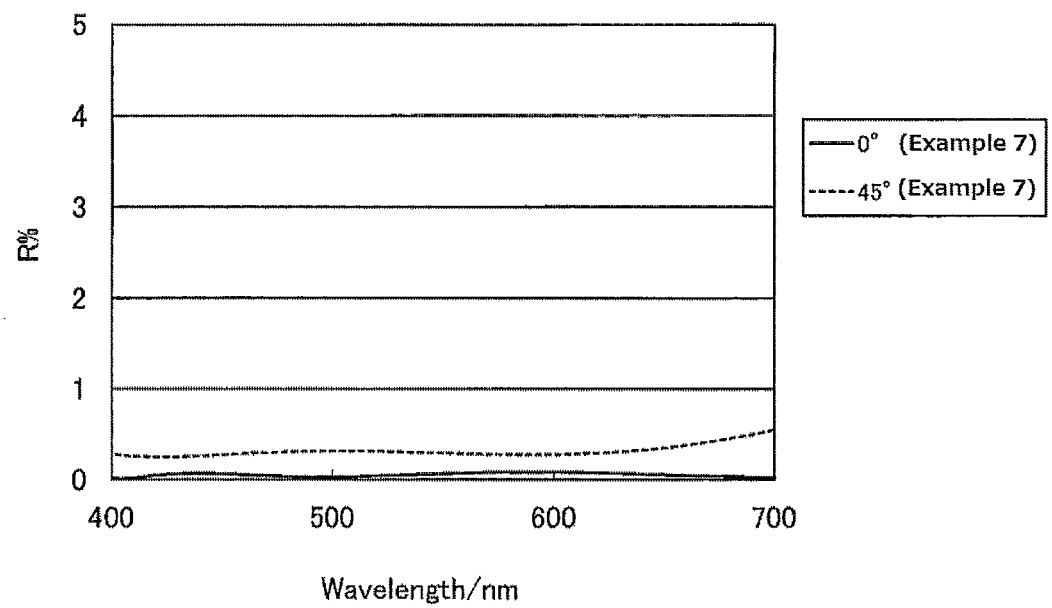
FIG. 9 is a graph showing the reflection property of the anti-reflection coat prepared in Example 7.
Figure 10:
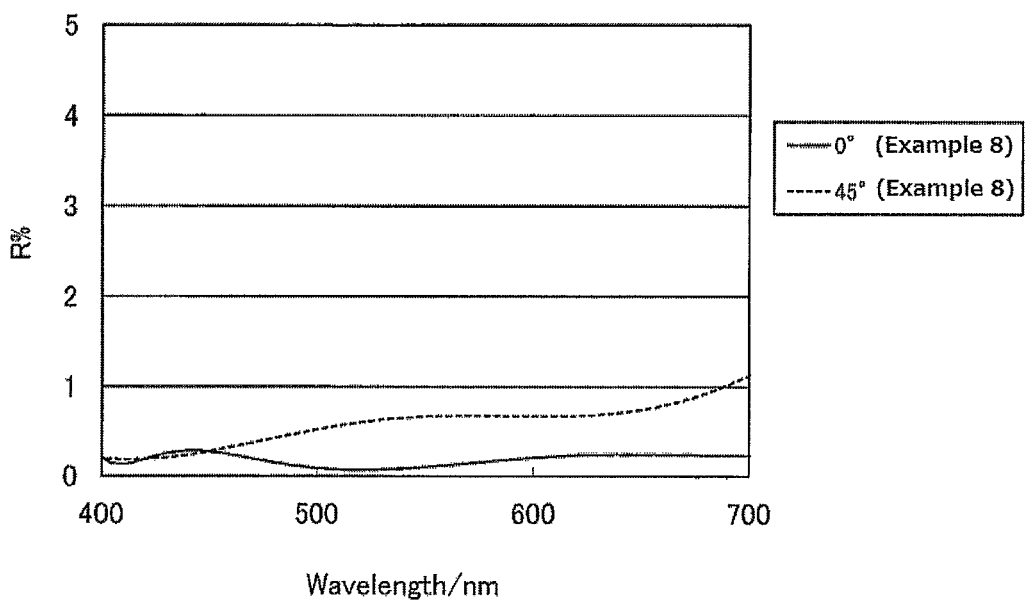
FIG. 10 is a graph showing the reflection property of the anti-reflection coat prepared in Example 8.

In the present invention, the hollow silica particle 131 is a silica particle having a balloon structure (hollow structure); specifically, the hollow silica particle 131 is a silica particle composed of an outer shell portion 131a and a hollow portion 131b of which periphery is completely surrounded by the outer shell portion 131a as schematically shown in FIG. 2(*a*). In the present invention in particular, the refractive index of the low refractive index layer 13 is made lower than the refractive index of silica itself (1.48) by using the hollow silica particle 131 having the hollow portion 131b as a main component in a constituent of the low refractive index layer 13. As compared to a layer composed of aggregated porous silica particles which has a large number of pores inside silica particles, the anti-reflection coat 10 formed is excellent in abrasion resistance and durability because the low refractive index layer 13 is formed as a layer composed of the hollow silica particles 131 in which the periphery of the hollow portions 131b is completely surrounded by the outer shell portions 131a and bound each other with a binder 132 as shown in FIG. 2(*b*); and the low refractive index layer 13 strongly adheres to the intermediate layer 12.

Note that, in the present invention, the hollow silica particles 131 preferably adheres each other in the state where the outside of the hollow silica particles 131 (the outside of the outer shell portions 131a) is coated with the binder 132. When the hollow silica particles 131 adheres each other with the binder 132 in the state where the outsides of the hollow silica particles 131 are coated with the binder 132, adhesion to the intermediate layer 12 is enhanced. As a result, the durability and the abrasion resistance of the anti-reflection coat 10 are enhanced. Further, the adsorption of water or other liquids to the hollow portions 131b of the hollow silica particles 131 and the void portions 133 in the low refractive index layer 13 is prevented by coating the outside of the hollow silica particles 131 with the binder 132.

In the low refractive index layer 13 formed as described above, the refractive index is preferably 1.15 or more and 1.24 or less. When the refractive index of the low refractive index layer 13 is less than 1.15, coating state of the hollow silica particles 131 in which the binder 132 sufficiently adheres the hollow silica particles 131 each other in the state that the hollow silica particles are coated with the binder 132 is hardly achieved. Consequently, the refractive index of the low refractive index layer 13 is less than 1.15 is not preferable because, for example, the durability of the low refractive index layer 13 is made poor. From the viewpoint described above, the refractive index of the low refractive index layer 13 is more preferably 1.17 or more. On the other hand, the refractive index of the low refractive index layer 13 exceeds 1.24 is not referable because reflectance at the reference wavelength is made high. So, from the viewpoint described above, the refractive index of the low refractive index layer 13 is preferably lower in the range described above, and is more preferably 1.23 or less.

As shown in FIG. 2(*b*), the void portions 133 other than the hollow portions 131b of the hollow silica particles 131 are preferably present in the low refractive index layer 13. The presence of the void portions 133 in the low refractive index layer 13 in addition to the hollow portions 131b of the hollow silica particles 131 will make the refractive index of the low refractive index layer 13 further lower than the refractive index of silica itself. In the present invention, even if the void portions 133 are not filled with a binder 132, the low refractive index layer 13 strongly adheres to the substrate 20 via the intermediate layer 12.

The preferable volume proportion occupied by the hollow silica particles 131 in the low refractive index layer 13 is 30% by volume or more and 99% by volume or less. The volume occupied by the hollow silica particles 131 is the total volume of the hollow silica spheres in the low refractive index layer 13 including the outer shell portions 131a and the hollow portions 131b surrounded by the outer shell portions 131a. The volume proportion occupied by the hollow silica particles 131 in the low refractive index layer 13 of less than 30% by volume is not preferable because the durability and the abrasion resistance of the low refractive index layer 13 is made poor. In addition, the volume proportion occupied by the binder 132 in the low refractive index layer 13 increases when the volume proportion occupied by the hollow silica particles 131 in the low refractive index layer 13 is less than 30% by volume. Consequently, it may makes management of the refractive index in the low refractive index layer 13 to be a value in the range described above difficult. From these viewpoints, the volume proportion occupied by the hollow silica particles 131 in the low refractive index layer 13 is more preferably 60% by volume or more. On the other hand, when the volume proportion occupied by the hollow silica particles 131 in the low refractive index layer 13 exceeds 99% by volume, the volume proportion occupied by the binder 132 which adheres the hollow silica particles 131 each other is low and sufficient adhesion among the hollow silica particles 131 each other may not be achieved, and consequently formation of the low refractive index layer 13 excellent in abrasion resistance and durability is made difficult. From the viewpoint of sufficiently adhering the hollow silica particles 131 each other and increasing the proportion of the void portions 133 present in the low refractive index layer 13, the volume proportion occupied by the hollow silica particles 131 in the low refractive index layer 13 is more preferably 90% by volume or less.

The average particle size $D_{50}$ of the hollow silica particle 131 as the layer-constituting raw material of the low refractive index layer 13 is preferably 5 nm or more and 100 nm or less. When the average particle size $D_{50}$ of the hollow silica particle 131 is less than 5 nm, providing of the void portions 133 in addition to the hollow portions 131b of the hollow silica particles 131 in the low refractive index layer 13 is made difficult. On the other hand, the average particle size of the hollow silica particles 131 exceeding 100 nm is not preferable because light scattering (haze) may occurs. The light scattering is not preferable because the antireflection coat 10 using the hollow silica particle 131 cannot satisfy the antireflection performance required for imaging devices. Moreover, when the average particle size of the hollow silica particles 131 exceeds 100 nm, accurate control of the physical film thickness of the low refractive index layer 13 with accuracy in a few nanometers is extremely made difficult.

Next, a resin material or a metal alkoxide can be used as the binder 132. The resin materials include epoxy resin, acrylic resin, fluororesin, silicone resin and cycloolefin resin (for example, ZEONEX (registered trademark)) and the monomer compounds of these resins. These resin materials are preferably ultraviolet light curable, normal-temperature curable or thermo-setting compounds; in particular, these resin materials are preferably ultraviolet light curable or normal temperature curable compounds. This is because when a substrate 20 having a high thermal expansion coefficient such as a resin substrate is used, forming of the low refractive index layer 13 without heat treatment can prevent deformation of the substrate 20 by thermal expansion. For example, a coating liquid is prepared by mixing these materials and the hollow silica particle 131, additives such as a polymerization initiator and a cross-linking agent are added if necessary and then diluted to an appropriate concentration by using a solvent or the like. Then the coating liquid is applied using a specific method of layer formation, wet methods such as a dip coating method, a spin coating method, a spray method, a roll coating method and a screen printing method. By using these methods, the low refractive index layer 13 is formed by applying the coating liquid to the surface of the inorganic base layer 11 to have an appropriate thickness, and then both cross-linking polymerization and evaporation of the solvents are finished by subjecting to ultraviolet light irradiation or heat treatment.

Next, when a metal alkoxide is used, the metal alkoxide which dissolves or suspends in a solvent to form a sol and then a gel is formed by hydrolysis and polymerization of the resulting sol is preferable to be a raw material. For example, it is preferable to use a material in which silica gel is formed by the hydrolysis and polymerization of a compound such as alkoxysilane or silsesquioxane. The low refractive index layer 13 is formed by the process including preparation of a sol-gel agent by dissolving or suspending these materials and the hollow silica particle 131 in a solvent; applying of the sol-gel agent to the surface of the inorganic base layer 11 by a method such as a spray coating method, a spin coating method, a dip coating method, a flow-coating method or a bar coating method; forming of a gel containing hollow silica particles 131 by hydrolysis; followed by evaporating the solvent, for example.

The preferable physical film thickness of the low refractive index layer 13 is in a range of 100 nm or more and 180 nm or less. The physical film thickness of the low refractive index layer 13 of less than 100 nm or exceeding 180 nm are not preferable because setting of the described above phase change at a suitable value is made difficult, and it may makes the antireflection performance of the anti-reflection coat 10 poor.

(5) Functional Layer 14

In the present invention, a functional layer 14 having a refractive index of 1.30 or more and 2.35 or less and a physical film thickness of 0.1 nm or more and 30 nm or less may be provided on the surface of the low refractive index layer 13 as shown in FIG. 1. Main structure of the anti-reflection coat 10 according to the present invention to achieve the antireflection function is an optical two-layer structure composed of the intermediate layer 12 and the low refractive index layer 13 provided on the substrate 20, or an optical three-layer structure composed of the inorganic base layer 11, the intermediate layer 12 and the low refractive index layer 13. Then, the functional layer 14 is an extremely thin film optically not affecting the antireflection performance achieved in the optical two-layer structure or the optical three-layer structure; the functional layer 14 is a layer having enhancing functions at the surface of the anti-reflection coat 10, for example, the hardness, abrasion resistance, heat resistance, weather resistance, solvent resistance, water repellency, oil repellency, antifog property, hydrophilicity, antifouling resistance and conductivity.

When the refractive index of the functional layer 14 is 1.30 or more and 2.35 or less and the physical film thickness of the functional layer 14 is 0.1 nm or more and 30 nm or less, the optical influence of the functional layer 14 on the antireflection effect achieved by the anti-reflection coat 10 can be neglected. When the refractive index exceeds the range described above, the functional film 14 may optically affects antireflection property of the anti-reflection coat 10. The film thickness of the functional layer 14 of less than 1 nm is not preferable because the functional layer 14 cannot exhibit the function required even when the functional layer 14 is provided. The film thickness of the functional layer 14 exceeding 30 nm is not preferable because the functional layer 14 may optically affects antireflection property of the anti-reflection coat 10 even when the refractive index of the functional layer 14 is in the range described above.

As the material constituting the functional layer 14, a transparent material having a refractive index of 1.30 or more and 2.35 or less can be used. A suitable material may be appropriately selected depending on the function to be achieved on the surface of the anti-reflection coat 10 as long as the material has a refractive index in the range described above and is transparent. The transparent inorganic material having a refractive index in the range described above may include $SiO_xN_y/SiO_2/SiO_x/Al_2O_3$/a mixture of $ZrO_2$ and $TiO_2$/a mixture of $La_2O_3$ and $TiO_2/SnO_2/ZrO_2$/a mixture of $La_2O_3$ and $Al_2O_3/Pr_2O_5$/ITO (indium tin oxide)/AZO (aluminum zinc oxide). In addition, the following materials can also be used: DLC (diamond-like carbon)/HMDSO (hexamethyldisiloxane)/epoxy resin/acrylic resin (in particular, PMMA resin (polymethyl methacrylate resin))/fluororesin and the like. Alternatively, various hard coating agents containing these materials may also be used. For formation of the functional layer 14, a suitable film formation method can be appropriately used depending on the material and the film thickness.

When the functional layer 14 is provided on the surface of the low refractive index layer 13, it is required to satisfy the total physical film thickness of 100 nm or more and 180 nm or less as the sum of the physical film thickness in the low refractive index layer 13 and the physical film thickness in the functional layer 14. The total physical film thickness exceeding the range is not preferable because the antireflection effect of the anti-reflection coat 10 may be made poor.

(6) Reflectance

When the anti-reflection coat 10 according to the present invention has the optical three-layer structure including the inorganic base layer 11, the intermediate layer 12 and the low refractive index layer 13, reflectance of the light incident at an incident angle of 0 degree having a wavelength of 400 nm or more and 800 nm or less is made to be 0.5% or less, and reflectance of the light having a wavelength of 400 nm or more and 700 nm or less incident at an incident angle of 45 degree or less is made to be 1.0% or less when the physical film thickness of these layers are managed in the ranges described above.

When the anti-reflection coat 10 according to the present invention has the optical two-layer structure including the intermediate layer 12 and the low refractive index layer 13, the anti-reflection coat 10 achieves the antireflection performance similar to that of the three-layer structure including the inorganic base layer 1 by making the refractive index n(2) satisfy the relation represented by formula (1) as a function of the refractive index n(sub) of the substrate and the refractive index n(1) of the low refractive index layer 131.

However, in comparison between the cases where the anti-reflection coat 10 is the optical two-layer structure and where the anti-reflection coat 10 is the optical three-layer structure including the inorganic base layer 11, the anti-reflection coat 10 is preferable to comprise the inorganic base layer 11 because the antireflection performance is further enhanced by increasing the stack number of the sub-layers constituting the inorganic base layer 11. Even when the inorganic base layer 11 is provided between the substrate 20 and the intermediate layer 12, the substrate 20 and the inorganic base layer 11 strongly adhere each other because the inorganic base layer 11 is provided by a vacuum film formation method, and adhesion between the intermediate layer 12 and the inorganic base layer 11 is assured also.

2. Optical Device

The optical device 100 according to the present invention is characterized in comprising the anti-reflection coat 10 described above. The optical device 100 may include imaging devices and projection devices; specifically include lenses, prisms (such as color separation prisms and color synthesis prisms), polarized beam splitters (PBSs) and cut filters (for example, for infrared ray or for ultraviolet ray). Next, the lenses include various lenses such as interchangeable lenses for single-lens reflex cameras, lenses mounted in digital cameras (DSCs) and lenses for use in digital cameras mounted in cellular phones. The optical device 100 shown in FIG. 1 is one example of the present invention which exemplifies layer structure schematically illustrated.

According to the embodiments described above, as the intermediate layer 12 which is mainly composed of an organometallic compound having sufficient adhesion to the binder 132 and having wettability to the coating liquid used when the low refractive index layer 13 is formed is provided on the substrate 20, the low refractive index layer 13 is formed well on the surface of the intermediate layer 12 with a wet film formation method, and the low refractive index layer 13 adheres well to the substrate 20 through the intermediate layer 12, as already described. Next, as the hollow silica particles 131 adheres well to the intermediate layer 12 with the binder 132, the detachment or the like of the low refractive index layer 12 caused by the dropout of the hollow silica particles 131 or the like is prevented, i.e. the anti-reflection coat 10 having beautiful outside appearance is manufactured. As the hollow silica particle 131 constituting the low refractive index layer 13 is a material excellent in durability and stability, the durability and the stability of the anti-reflection coat 10 is made excellent. Moreover, the anti-reflection coat 10 according to the present invention exhibits excellent antireflection property for the light beam in a wide wavelength band and at a wide incident angle range because the interface-reflected light generates at the interface between the individual layers or the interface with the substrate 20 is utilized.

The embodiments described above are respectively one aspect of the anti-reflection coat 10 and one aspect of the optical device 100 according to the present invention, i.e. embodiments can be appropriately modified within a scope not apart from the object of the present invention as a matter of course. Hereinafter, the present invention will be described more specifically with reference to Examples; however, the present invention is not limited to following Examples.

EXAMPLES

Example 1

In Example 1, a lens (refractive index n=1.86) made of optical glass FDS90 manufactured by HOYA Corp. was used as the substrate 20. On the surface of the substrate 20, an anti-reflection coat 10 having a multilayer structure shown in Table 1 was provided. Specifically, the anti-reflection coat 10 was prepared as follows. First, an inorganic base layer 11 was formed on the surface of the substrate 20 by using the ARES 1510 manufactured by Leybold Optics GmbH according to a vacuum vapor deposition method. As shown in Table 1, the inorganic base layer 11 was made to have a two-layer structure by sequentially stacking an extremely thin film of $Al_2O_3$ (refractive index n=1.63) and an extremely thin film of $SiO_2$ (n=1.48) on the surface of the substrate 20. The thicknesses of the layers constituting the inorganic base layer 11 are as shown in Table 1. In the present specification, a just "$SiO_2$" is general silica without hollow structure.

By the way, an intermediate layer 12 composed of an organosilicon oxide film can be formed on the surface of the inorganic base layer 11 by a plasma CVD method using a plasma gun equipped in the ARES 1510 manufactured by Leybold Optics GmbH. Specifically, hexamethyldisiloxane (HMDSO) gas as a thin film-constituting raw material was introduced into the atmosphere including oxygen or argon converted into plasma by the plasma gun (APS) to deposit an organosilicon oxide film formed by plasma polymerization reaction on the surface of the inorganic base layer 11 of the substrate 20 placed in a chamber. In the process, the refractive index of the prepared HMDSO film can be appropriately managed within a range from 1.40 to 1.65 by arranging the gas flow rates and the discharge conditions; a flow rate range of the hexamethyldisiloxane gas introduced into the chamber from 200 sccm to 500 sccm, a flow rate range of oxygen gas from 5 sccm to 100 sccm, a discharge electric voltage range from 90 V to 120 V and a discharge electric current range from 10 A to 30 A. In Example 1, the intermediate layer 12 composed of an organosilicon oxide film having a refractive index of 1.54 and a physical film thickness of 47 nm was formed by setting flow rate of hexamethyldisiloxane gas at 400 sccm, flow rate of oxygen gas at 10 sccm, discharge electric voltage at 90V and discharge electric current at 20 A as shown in Table 1. In Tables 1 to 8 shown later, the materials used for forming of the intermediate layer 12 are also disclosed in parentheses along with the components constituting the intermediate layer 12.

Next, a low refractive index layer 13 was formed on the surface of the intermediate layer 12. In formation of the low refractive index layer 13, a film was coated by using MS-A150 manufactured by Mikasa Co., Ltd. with a spin coating method by using a coating liquid prepared by dissolving and suspending a hollow silica particle 131 and acrylic resin as a binder component in a solvent. Then, both cross-linking polymerization of the polymerization component and evaporation of the solvents in the coating film were finished by heating the coating film at 90° C. for 12 seconds for pre-baking, followed by heating at 150° C. for 1 hour for baking. As a result, the coating film was completely cured, and thus the low refractive index layer 13 including the hollow silica particles 131 adhere each other with acrylic resin (the binder 132) was prepared. The refractive index and the physical film thickness of the low refractive index layer 13 were 1.20 and 108 nm, respectively.

TABLE 1

|  | Material | Refractive index | Physical film thickness (nm) |
|---|---|---|---|
| substrate | FDS90 | 1.86 | — |
| Inorganic base layer | $Al_2O_3$ | 1.63 | 42 |
|  | $SiO_2$ | 1.48 | 5 |
| Intermediate layer | Organosilicon oxide (HMDSO) | 1.54 | 47 |
| Low refractive index layer | Hollow silica particle + acrylic resin | 1.20 | 108 |

Example 2

In Example 2, an intermediate layer 12 composed of an organosilicon oxide film was formed by using tetramethylsilane (TMS). Layer structure of the anti-reflection coat 10 and thickness of each layer were set as shown in Table 2. The inorganic base layer 11 and the low refractive index layer 13 were each formed in almost the same manner as in Example 1, and the intermediate layer 12 was formed as follows.

By the way, in the formation of the intermediate layer 12, an organosilicon oxide film can be deposited on the surface of the inorganic base layer 11 in almost the same manner as in Example 1 except that tetramethylsilane is used as the thin film-constituting raw material. In the process, the refractive index of the prepared organosilicon oxide film can be appropriately managed within a range from 1.40 to 1.65, by arranging the gas flow rates and the discharge conditions within a flow rate range of the tetramethylsilane gas introduced into the chamber from 10 sccm to 200 sccm, a flow rate range of oxygen gas from 5 sccm to 200 sccm, a flow rate range of argon gas from 5 sccm to 200 sccm, a discharge electric voltage range from 90 V to 120 V and a discharge electric current range from 10 A to 30 A. In Example 2, the intermediate layer 12 having a refractive index of 1.54 and a physical film thickness of 1 nm was formed by setting the flow rate of tetramethylsilane gas at 50 sccm, the flow rate of oxygen gas at 50 sccm, the flow rate of argon gas at 50 sccm, the discharge electric voltage at 90 V and the discharge electric current at 20 A as shown in Table 2.

TABLE 2

|  | Material | Refractive index | Physical film thickness (nm) |
|---|---|---|---|
| substrate | FDS90 | 1.86 | — |
| Inorganic base layer | $Al_2O_3$ | 1.63 | 57 |
|  | $SiO_2$ | 1.48 | 43 |
| Intermediate layer | Organosilicon oxide (TMS) | 1.54 | 1 |
| Low refractive index layer | Hollow silica particle + acrylic resin | 1.20 | 101 |

Example 3

In Example 3, an anti-reflection coat 10 was prepared in the same manner as in Example 1 except that layer structure and thickness of each layer were set as shown in Table 3.

TABLE 3

|  | Material | Refractive index | Physical film thickness (nm) |
|---|---|---|---|
| substrate | FDS90 | 1.86 | — |
| Inorganic base layer | $Al_2O_3$ | 1.63 | 11 |
|  | $TiO_2 + ZrO_2$ | 2.10 | 29 |
|  | $Al_2O_3$ | 1.63 | 30 |
|  | $TiO_2 + ZrO_2$ | 2.10 | 31 |
|  | $Al_2O_3$ | 1.63 | 71 |
|  | $TiO_2 + ZrO_2$ | 2.10 | 3 |
|  | $SiO_2$ | 1.48 | 35 |
| Intermediate layer | Organosilicon oxide (HMDSO) | 1.54 | 1 |
| Low refractive index layer | Hollow silica particle + acrylic resin | 1.20 | 104 |

Example 4

In Example 4, the anti-reflection coat 10 was prepared in the same manner as in Example 1 except that the N-BK7 manufactured by SCHOTT AG was used as the substrate 20, and layer structure and thickness of each layer were set as shown in Table 4.

TABLE 4

|  | Material | Refractive index | Physical film thickness (nm) |
|---|---|---|---|
| substrate | N-BK7 | 1.52 | — |
| Inorganic base layer | $Al_2O_3$ | 1.63 | 93 |
|  | $TiO_2 + ZrO_2$ | 2.10 | 23 |
|  | $Al_2O_3$ | 1.63 | 36 |
|  | $TiO_2 + ZrO_2$ | 2.10 | 33 |
|  | $Al_2O_3$ | 1.63 | 93 |
| Intermediate layer | Organosilicon oxide (HMDSO) | 1.54 | 4 |
| Low refractive index layer | Hollow silica particle + acrylic resin | 1.20 | 113 |

Example 5

Next, the method for manufacturing the anti-reflection coat 10 prepared in Example 5 will be described. In Example 5, N-LAK14 manufactured by SCHOTT AG (refractive index n=1.69) was used as the substrate 20, and the inorganic base layer 11 having layer structure shown in Table 5 was formed in the same manner as in Example 1. Then, the intermediate layer 12 composed of a self-assembled monomolecular film of an organosilicon compound was formed by using hexamethyldisilazane (HMDS) as the layer-constituting raw material of the intermediate layer 12.

Specifically, the intermediate layer 12 was formed as follows. The substrate 20 after the formation of the inorganic base layer 11 was immersed in a solution of hexamethyldisilazane for 5 to 20 minutes. Thus, a self-assembled monomolecular film in which the molecular orientations are ordered and uniform due to the intermolecular force was formed on the surface of the inorganic base layer 11 through chemical bonding and adsorbing of the hexamethyldisilazane molecules in the solution of the hexamethyldisilazane molecules. Then, the intermediate layer 12 composed of the self-assembled monomolecular film using HMDS as the raw material was formed on the surface of the inorganic base layer 11 after ultrasonic cleaning using isopropyl alcohol (IPA).

TABLE 5

| | Material | Refractive index | Physical film thickness (nm) |
|---|---|---|---|
| substrate | N-LAK14 | 1.69 | — |
| Inorganic base layer | $SiO_2$ | 1.48 | 58 |
| | $TiO_2 + ZrO_2$ | 2.10 | 5 |
| | $SiO_2$ | 1.48 | 7 |
| Intermediate layer | Organosilicon oxide (HMDS) | 1.54 | 1 |
| Low refractive index layer | Hollow silica particle + acrylic resin | 1.20 | 117 |

Note that, the following method can also be used as the method for forming a self-assembled monomolecular film by using HMDS. Specifically, 20 ml solution of hexamethyldisilazane and a substrate 20 on the surface of which an inorganic base layer 11 should be formed are placed in separate in a thermostatic chamber at a normal temperature, and then elevate a temperature in the thermostatic chamber to 40° C. to 60° C. to evaporate the solution of hexamethyldisilazane for 20 minutes. Thus, the evaporated hexamethyldisilazane molecules chemically bond and adsorb to the surface of the inorganic base layer 11 to form a self-assembled monomolecular film. By using such a method, an intermediate layer 12 composed of the self-assembled monomolecular film (SAM film) same as described above is formed on the surface of the inorganic base layer 11.

Note that, hexamethyldisilazane and the silicon dioxide layer (the outermost layer of the glass substrate 20 or the inorganic base layer 11) react with each other as described below. Hydroxyl groups (OH groups) present on the surface of the silicon dioxide layer. When the solution of hexamethyldisilazane contacts with the surface of the silicon dioxide layer at about 40° C. to 60° C., the OH groups and hexamethyldisilazane $((CH_3)_3Si—NH—Si(CH_3)_3)$ react with each other and $—O—Si(CH_3)_3$ groups are formed on the surface of the silicon dioxide layer. Thus, the self-assembled monomolecular film of the organosilicon oxide is formed on the surface of the silicon dioxide layer. So, when a self-assembled monomolecular film of an organosilicon oxide is formed on the surface of the inorganic base layer 11, the outermost layer of the inorganic base layer 11 is preferably a silicon dioxide layer. It is preferable to perform a pre-treatment such as preliminary cleaning on the surface of the substrate 20 (when the inorganic base layer 11 is formed, the surface of the inorganic base layer 11) as a matter of course.

Example 6

In Example 6, N-LAK14 manufactured by SCHOTT AG was used as the substrate 20, and the intermediate layer 12 was formed directly on the surface of the substrate 20 without providing the inorganic base layer 11. The intermediate layer 12 and the low refractive index layer 13 were each formed in the same manner as in Example 1. Layer structure and thickness of each layer were set as shown in Table 6. The refractive index of the intermediate layer was set to satisfy the range represented by formula (1) as follows: $1.45 \leq n(2)(=1.52) \leq 1.54$.

TABLE 6

| | Material | Refractive index | Physical film thickness (nm) |
|---|---|---|---|
| substrate | N-LAK14 | 1.69 | — |
| Intermediate layer | Organosilicon oxide (HMDSO) | 1.52 | 87 |
| Low refractive index layer | Hollow silica particle + acrylic resin | 1.20 | 110 |

Example 7

In Example 7, N-LAK14 manufactured by SCHOTT AG was used as the substrate 20. As the intermediate layer 12, an organotitanium oxide (organo-$TiO_2$) film was formed. Layer structure and thickness of each layer in the anti-reflection coat 10 were set as shown in Table 7, and the inorganic base layer 11 and the low refractive index layer 13 were each formed in the same manner as in Example 1.

In the formation of the intermediate layer 12, titanium isopropoxide was used as the thin film-constituting raw material, and the same vacuum film formation apparatus as used in Example 1 was used. In the presence of oxygen gas and argon gas, titanium isopropoxide was evaporated by a plasma gun to deposit an organotitanium oxide film on the surface of the inorganic base layer 11. In the process, a dense organotitanium oxide film having a refractive index in a range from about 1.9 to 2.1 and excellent in durability can be formed by arranging the gas flow rates and the discharge conditions within a flow rate range of the titanium isopropoxide gas from 10 sccm to 200 sccm, a flow rate range of oxygen gas from 5 sccm to 200 sccm, a flow rate range of argon gas from 5 sccm to 200 sccm, a discharge electric voltage range from 90 V to 150 V and a discharge electric current range from 10 A to 30 A. In Example 7, an intermediate layer 12 composed of an organotitanium oxide film having a refractive index of 2.10 and a physical film thickness of 1 nm was formed on the surface of the inorganic base layer 11 by appropriately arranging these conditions.

TABLE 7

| | Material | Refractive index | Physical film thickness (nm) |
|---|---|---|---|
| substrate | N-LAK14 | 1.69 | — |
| Inorganic base layer | $SiO_2$ | 1.48 | 4.5 |
| | $Nb_2O_5$ | 2.25 | 11 |
| | $SiO_2$ | 1.48 | 45 |
| | $Nb_2O_5$ | 2.25 | 16 |
| | $SiO_2$ | 1.48 | 79 |
| | $Nb_2O_5$ | 2.25 | 6 |
| Intermediate layer | Organic $TiO_2$ (Titanium isopropoxide) | 2.10 | 1 |
| Low refractive index layer | Hollow silica particle + acrylic resin | 1.20 | 129 |

Example 8

In Example 8, N-LAK14 manufactured by SCHOTT AG (refractive index n=1.69) was used as the substrate 20 and the thickness of the intermediate layer 12 was set at 160 nm. Layer structure and the thicknesses of each layer in the anti-reflection coat 10 were set as shown in Table 8, and the layers were each formed in almost the same manner as in Example 1.

TABLE 8

|  | Material | Refractive index | Physical film thickness (nm) |
|---|---|---|---|
| substrate | N-LAK14 | 1.69 | — |
| Inorganic base layer | $SiO_2$ | 1.48 | 28 |
|  | $TiO_2 + ZrO_2$ | 2.10 | 14 |
|  | $SiO_2$ | 1.48 | 75 |
|  | $TiO_2 + ZrO_2$ | 2.10 | 4 |
|  | $SiO_2$ | 1.48 | 16 |
|  | $TiO_2 + ZrO_2$ | 2.10 | 3 |
|  | $SiO_2$ | 1.48 | 86 |
|  | $TiO_2 + ZrO_2$ | 2.10 | 5 |
| Intermediate layer | Organosilicon oxide (HMDSO) | 1.54 | 160 |
| Low refractive index layer | Hollow silica particle + acrylic resin | 1.20 | 111 |

COMPARATIVE EXAMPLES

Comparative Example 1

As the anti-reflection coat of Comparative Example 1, an anti-reflection coat was prepared on the substrate 20 in almost the same manner as in Example 1 except that layer structure and thickness of each layer were set as shown in Table 9 and the intermediate layer 12 was not provided.

TABLE 9

|  | Material | Refractive index | Physical film thickness (nm) |
|---|---|---|---|
| substrate | FDS90 | 1.86 | — |
| Inorganic base layer | $Al_2O_3$ | 1.63 | 57 |
|  | $SiO_2$ | 1.48 | 44 |
| Low refractive index layer | Hollow silica particle + acrylic resin | 1.20 | 101 |

Comparative Example 2

In Comparative Example 2, the layers were each formed in almost the same manner as in Example 1 except that N-LAK14 manufactured by SCHOTT AG was used as the substrate 20, layer structure and the thicknesses of each layer were set as shown in Table 9 and the intermediate layer 12 was not provided.

TABLE 10

|  | Material | Refractive index | Physical film thickness (nm) |
|---|---|---|---|
| substrate | N-LAK14 | 1.69 | — |
| Inorganic base layer | $SiO_2$ | 1.48 | 8 |
|  | $TiO_2 + ZrO_2$ | 2.10 | 20 |
|  | $SiO_2$ | 1.48 | 38 |
|  | $TiO_2 + ZrO_2$ | 2.10 | 16 |
|  | $SiO_2$ | 1.48 | 5 |
|  | $TiO_2 + ZrO_2$ | 2.10 | 11 |
|  | $SiO_2$ | 1.48 | 70 |
|  | $TiO_2 + ZrO_2$ | 2.10 | 11 |

TABLE 10-continued

|  | Material | Refractive index | Physical film thickness (nm) |
|---|---|---|---|
| Low refractive index layer | Hollow silica particle + acrylic resin | 1.20 | 129 |

[Evaluations]

1. Evaluation Method

Film formability, adhesion and antireflection property in anti-reflection coats 10 prepared in Examples 1 to 8 and Comparative Examples 1 and 2 described above were each evaluated. Note that, when both the anti-reflection coats 10 prepared in Examples and the anti-reflection coats prepared in Comparative Examples are simultaneously referred to, these are described as the anti-reflection coats (10).

(1) Film Formability

Film formability in each anti-reflection coats (10) described above was evaluated as the outside appearance of the anti-reflection coats (10). After the formation of each anti-reflection coat (10), each anti-reflection coats (10) described above was evaluated by bear eyes.

(2) Adhesion

Adhesion in each anti-reflection coat (10) was evaluated as the film strength of each anti-reflection coat (10). In the film strength evaluation, each surface of the anti-reflection coats (10) was rubbed back and forth 10 times applying a predetermined load by using Ulti Wipe manufactured by Tsubakimoto Kogyo Co., Ltd., and then the occurrence or non-occurrence of the change of the outside appearance in each anti-reflection coats (10) was investigated. Note that, when the surface of each anti-reflection coat (10) was rubbed, the loads were 20 g, 100 g and 500 g. The load 20 g is approximately a load corresponding to rubbing the surface of each anti-reflection coat (10); the load 100 g is approximately a load corresponding to gently wiping the surface of each anti-reflection coat (10); and the load 500 g is approximately a load corresponding to strongly wiping the surface of each anti-reflection coat (10).

(3) Antireflection Property

The spectroscopic reflectances of each anti-reflection coat (10) were measured in combinations of incident angles of the light beam incident on each anti-reflection coats (10) set at 0 degree and 45 degrees and incident light wavelength band from 400 to 700 nm. In the spectroscopic reflectance measurement, Spectrophotometer U4000 manufactured by Hitachi High-Technologies Co., Ltd. was used.

2. Evaluation Results (1) Film Formability

Table 11 shows the evaluation result of the outside appearance of the anti-reflection coat (10) prepared in each of Examples and Comparative Examples. In Table 11, the mark "A" denotes that the outside appearance of the anti-reflection coat (10) is good and the mark "B" denotes that the outside appearance of the anti-reflection coat (10) is not good. As is apparent in Table 11, it is confirmed that the anti-reflection coats prepared in Comparative Examples 1 and 2 in which no intermediate layer 12 is provided were not good in outside appearance. In contrast, it was confirmed that the anti-reflection coats 10 prepared in Examples 1 to 8 in which the intermediate layer 12 is provided were all good in outside appearance. As is apparent in these results, film formability of the low refractive index layer 13 formed by a wet film formation method is improved by providing the low refractive index layer 13 on the surface of the intermediate layer 12, and the anti-reflection coat 10 without unevenness in outside appearance and being uniform is formed. In contrast, the wettability of the coating liquid of the low refractive index layer 13 formed by a wet film formation method on the substrate 20 or the inorganic base layer 11 is poor when no intermediate layer 12 is provided, thus the low refractive index layer 13 formed could not be beautiful, consequently the outside appearance of the anti-reflection coat is also made poor because film formability of the low refractive index layer 13 is also made poor.

(2) Adhesion

Table 11 shows the evaluation results on the film strength of each anti-reflection coats (10) prepared in Examples and Comparative Examples. In Table 11, the mark "A" denotes that no outside appearance change was observed between before and after the evaluation test. In other words, the mark "A" is that the film strength of the anti-reflection coat (10) is high; in yet other words, the mark "A" denotes that adhesion of the anti-reflection coat (10) to the substrate is excellent. The mark "C" denotes that the outside appearance after the evaluation test is deteriorated and the strength of the anti-reflection coat (10) is low; in other words, adhesion of the anti-reflection coat (10) to the substrate is poor. The mark "B" denotes that fine flaws were observed only in a partial portion, and adhesion of the anti-reflection coat (10) to the substrate is slightly poor.

As apparent in Table 11, when the load is 20 g (corresponding to "rubbing" in Table 11), no outside appearance change was observed in any of the anti-reflection coats (10), and no flaws or the like generates on the surface of any of the anti-reflection coats (10). When the load is 100 g (corresponding to "gentle wiping" in Table 11), a large number of flaws were observed on the surface of the anti-reflection coat of Comparative Example 1 in the evaluation test. When the film strength evaluation test is performed with the load of 500 g (corresponding to "strong wiping" in Table 11), the low refractive index layer 13 which is the surface layer of the anti-reflection coat of Comparative Example 1 peeled off in the evaluation test. On the other hand, the anti-reflection coat prepared in Comparative Example 2 can be judged to be good in adhesion to the substrate; however, the anti-reflection coat prepared in Comparative Example 2 was low in film formability of the low refractive index layer as described above, i.e. anti-reflection coat having good outside appearance was formed.

In contrast, any of the anti-reflection coats 10 prepared in Examples 1 to 8 exhibited no outside appearance change when the load of 100 g was applied, and is apparent that the anti-reflection coats 10 prepared in Examples 1 to 8 have good adhesion to the substrate. On the other hand, in anti-reflection coats 10 prepared in Examples 2 and 7, fine flaws were observed in a small portion of the anti-reflection coat 10 when a load of 500 g was applied, i.e. the anti-reflection coats 10 prepared in Examples 2 and 7 are slightly poor in adhesion as compared to the other anti-reflection coats 10 prepared in other Examples. In Example 2, an organosilicon oxide film formed by using tetramethylsilane as a raw material and having a physical film thickness of 1 nm is provided as the intermediate layer 12. In Example 7, an organotitanium oxide film having a physical film thickness of 1 nm is provided as the intermediate layer 12. On the other hand, in the other Examples (Example 1, Examples 3 to 6, and Example 8), an organosilicon oxide film formed by using hexamethyldisiloxane or hexamethyldisilazane as a raw material and having a physical film thickness in a range from 1 nm to 160 nm is provided as the intermediate layer 12. Thus, it is made apparent that when an organosilicon oxide film as the intermediate layer 12 formed by using hexamethyldisiloxane or hexamethyldisilazane as a raw material is provided as in Example 1, Examples 3 to 6 and Example 8, adhesion of the anti-reflection coat to the substrate is good irrespective of the physical film thickness of the intermediate layer 12. In comparison among anti-reflection coats 10 prepared in Examples 2 and 7 with Examples 3 and 5, it is apparent that when the physical film thickness of the intermediate layer 12 is made as extremely thin as 1 nm, adhesion of the organosilicon oxide films formed by using tetramethylsilane as a raw material or the organotitanium oxide film are slightly poor than adhesion of the organotitanium oxide formed by using hexamethyldisiloxane or hexamethyldisilazane as a raw material. Thus, it is preferable to provide the organosilicon oxide film formed by using hexamethyldisiloxane or hexamethyldisilazane as a raw material as the intermediate layer 12, from the viewpoint of being extremely excellent in adhesion to the substrate irrespective of the physical film thickness of the intermediate layer 12.

(3) Antireflection Property

Figure 11:
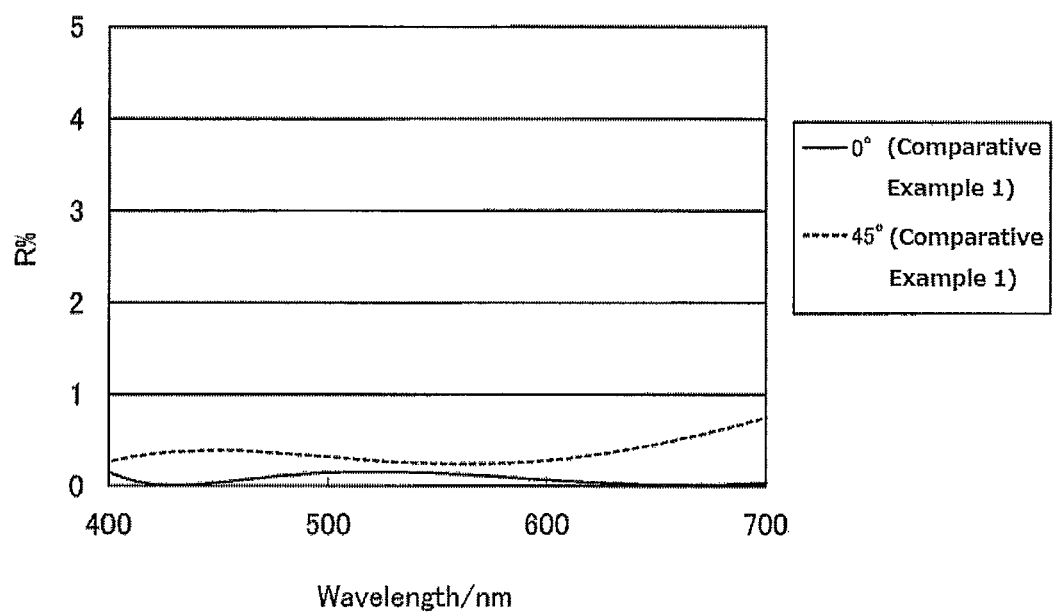
FIG. 11 is a graph showing the reflection property of the anti-reflection coat prepared in Comparative Example 1.
Figure 12:
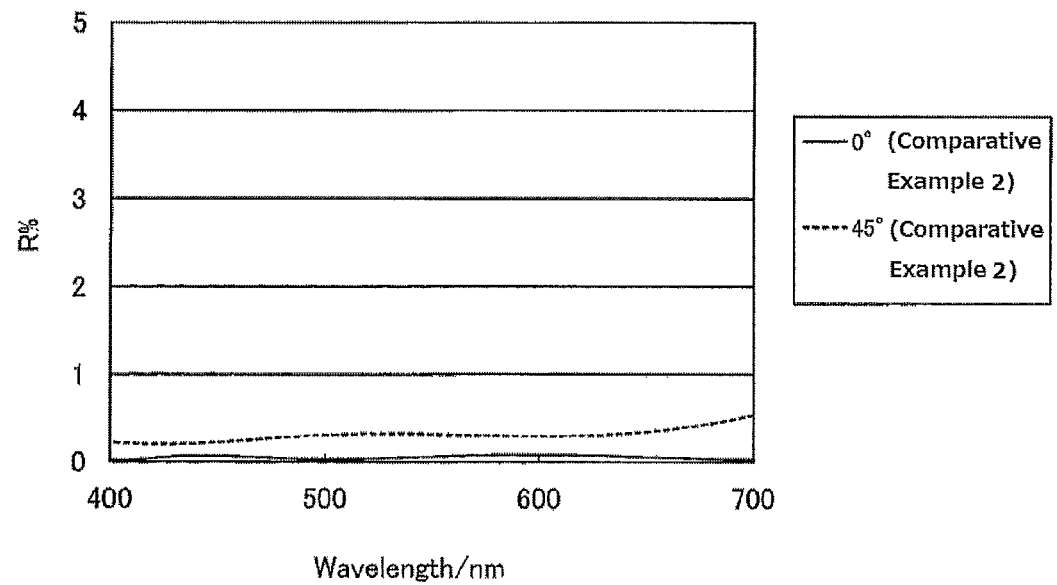
FIG. 12 is a graph showing the reflection property of the anti-reflection coat prepared in Comparative Example 2.

FIGS. 3 to 10 show the measurement results of antireflection property in the anti-reflection coats 10 prepared in Examples 1 to 8 respectively. FIGS. 11 and 12 show the measurement results of antireflection property in the anti-reflection coats prepared in Comparative Examples 1 and 2 respectively. Table 11 shows the maximum values of reflectances at the incident angles of 0° and 45° in incident light wavelength band of from 400 nm to 700 nm.

Any of the anti-reflection coats (10) prepared in Examples 1 to 8 and Comparative Examples 1 and 2 achieve a maximum spectroscopic reflectance value of 0.5% or less at the incident angle of 0° in incident light wavelength band of from 400 nm to 700 nm. When light is incident at the incident angle of 45° in the wavelength band described above, the maximum spectroscopic reflectance values were 1.0% or less except in the anti-reflection coat 10 prepared in Example 8. As described above, any of the anti-reflection coats comprising a low refractive index layer including hollow silica particles adhere each other with a binder are extremely excellent in antireflection performance. On the other hand, the anti-reflection coat 10 prepared in Example 8 has the maximum spectroscopic reflectance of 1.12% with the incident angle of 45° and is slightly poor than that of the other anti-reflection coats (10); but is still excellent in antireflection performance. The physical film thicknesses of the intermediate layer 12 are in a range from 1 nm to 87 nm in anti-reflection coats 10 prepared in Examples 1 to 7. However, the physical film thickness of the intermediate layer is 160 nm in the anti-reflection coat 10 prepared in Example 8. According to the diligent study made by the present inventors, when the physical film thickness of the intermediate layer exceeds 150 nm, the antireflection performance of the anti-reflection coat is slightly made poor as shown in Example 8 because the film design to satisfy the optical properties required in the intermediate layer 12 as the optical interference layer is made difficult. So, from the viewpoint of improving antireflection property, it is preferable to set the physical film thickness of the intermediate layer 12 at 150 nm or less.

When the anti-reflection coats 10 prepared in Examples 3, 4 and 7 are compared to the anti-reflection coats 10 prepared in other Examples (Examples 1, 2, 5, 6 and 8), the maximum spectroscopic reflectance in the wavelength band described above are all lower in the anti-reflection coats 10 prepared in Examples 3, 4 and 7. Note that, the number of the sub-layers constituting the inorganic base layer 11 is 5 to 7 in Examples 3, 4 and 7, but is 3 or less in other Examples. Next, when the anti-reflection coat 10 prepared in Example 6 including no inorganic base layer 11 is compared to that of the anti-reflection coats 10 prepared in other Examples (Examples 1, 2 and 5) in each of which the number of the sub-layers constituting the inorganic base layer 11 is 3 or less, the maximum spectroscopic reflectance is almost same or slightly poor in the anti-reflection coat 10 prepared in Example 6. So, it is apparent that when the condition represented by the formula (1) is satisfied, high antireflection performance is achieved even when the intermediate layer 12 is formed directly on the surface of the substrate 20. Further, it is also apparent that it is preferable to increase the number of the sub-layers constituting the inorganic base layer when the antireflection performance of the anti-reflection coat is intended to further enhance.

TABLE 11

| | substrate | Inorganic under-layer | Intermediate layer material (film thickness) | Spectroscopic reflectance Wavelength band: 400 to 700 nm | | Outside appearance | Film strength | | |
|---|---|---|---|---|---|---|---|---|---|
| | | | | Incident angle: 0° | Incident angle: 45° | | Rubbing | Gentle wiping | Strong wiping |
| Example 1 | FDS90 | Present | HMDSO (47 nm) | 0.15% | 0.74% | A | A | A | A |
| Example 2 | FDS90 | Present | TMS (1 nm) | 0.15% | 0.74% | A | A | A | B |
| Example 3 | FDS90 | Present | HMDSO (1 nm) | 0.08% | 0.52% | A | A | A | A |
| Example 4 | N-BK7 | Present | HMDSO (4 nm) | 0.05% | 0.43% | A | A | A | A |
| Example 5 | N-LAK14 | Present | HMDS (1 nm) | 0.15% | 0.73% | A | A | A | A |
| Example 6 | N-LAK14 | Absent | HMDSO (87 nm) | 0.21% | 0.84% | A | A | A | A |
| Example 7 | N-LAK14 | Present | Organic TiO$_2$ (1 nm) | 0.08% | 0.55% | A | A | A | B |
| Example 8 | N-LAK14 | Present | HMDSO (160 nm) | 0.28% | 1.12% | A | A | A | A |
| Comparative Example 1 | FDS90 | Present | None | 0.16% | 0.74% | B | A | C | C |
| Comparative Example 2 | N-LAK14 | Present | None | 0.08% | 0.53% | B | A | A | A |

INDUSTRIAL APPLICABILITY

The anti-reflection coat according to the present invention is excellent in film formability, adhesion and the durability of the low refractive index layer; and has excellent antireflection property for the light beam having a wide wavelength band and a wide incident angles. So, the anti-reflection coat according to the present invention can be suitably used in optical apparatuses such as optical apparatuses wide in incident light wavelength band and optical apparatuses using lenses high in curvature.

DESCRIPTION OF SYMBOLS

10 . . . Anti-reflection coat
11 . . . Inorganic base layer
12 . . . Intermediate layer
13 . . . Low refractive index layer
14 . . . Functional layer
20 . . . substrate
100 . . . optical device

The invention claimed is:

1. An anti-reflection coat comprising an inorganic base layer, an intermediate layer and a low refractive index layer sequentially stacked on a substrate, and preventing the reflection of incident light by optical interference effect in at least each of the inorganic base layer and the low refractive index layer, wherein the low refractive index layer is a layer including hollow silica particles adhering each other with a binder formed on the surface of the intermediate layer by a wet film formation method using a coating liquid including layer-constituting raw materials, and wherein the low refractive index layer has a refractive index chosen from a range of 1.15 to 1.24, the intermediate layer is a layer mainly composed of an organometallic compound which adheres well to the binder and having wettability to the coating liquid, the inorganic base layer is a physical vapor-deposited film composed of transparent inorganic raw materials, and wherein a reflectance of light of the anti-reflection coat in wavelength band of 400 nm to 700 nm incident at an incident angle of 0 degree is 0.5% or less, and a reflectance of light of the anti-reflection coat in wavelength band of 400 nm to 700 nm incident at an incident angle of 0 degree or more and 45 degrees or less is 1.0% or less.

2. The anti-reflection coat according to claim 1, wherein the intermediate layer is an organosilicon compound layer mainly composed of an organosilicon compound.

3. The anti-reflection coat according to claim 1, wherein the intermediate layer is a layer mainly composed of an organotitanium compound or an organozirconium compound.

4. The anti-reflection coat according to claim 1, wherein the intermediate layer is a layer composed of a self-assembled monomolecular film.

5. The anti-reflection coat according to claim 1, wherein the intermediate layer is a layer formed by a vacuum film formation method or a wet film formation method.

6. The anti-reflection coat according to claim 1, wherein when the refractive index of the low refractive index layer is denoted by n(1) and the refractive index of the substrate is denoted by n(sub), the refractive index of the intermediate layer denoted by n(2) satisfies the relation represented by the following formula (1):

[Expression 1]

$$n(1) \times \sqrt{n(\text{sub})} \times 0.930 \leq n(2) \leq n(1) \times \sqrt{n(\text{sub})} \times 0.985 \quad (1)$$

Wherein; $1.15 \leq n(1) \leq 1.24$.

7. The anti-reflection coat according to claim 1, wherein the inorganic base layer is a single layer film composed of a transparent inorganic material having a refractive index of 1.35 or more and 2.5 or less, or a multilayer film comprising a plurality of thin stacked layers composed of the transparent inorganic material.

8. The anti-reflection coat according to claim 1, wherein the surface of the intermediate layer is subjected to a surface treatment for improving the wettability to the coating liquid.

9. The anti-reflection coat according to claim 1, wherein the average particle size of the hollow silica particle is 5 nm or more and 100 nm or less, the hollow silica particles adhere each other by the binder in the state that the outside of the hollow silica particles is coated with the binder, and void portions in addition to the hollow portions in the hollow silica particles are present in the low refractive index layer.

10. The anti-reflection coat according to claim 1, further comprising a functional layer having a refractive index of 1.30 or more and 2.35 or less and having a physical thickness of 1 nm or more and 30 nm or less on the surface of the low refractive index layer.

11. The anti-reflection coat according to claim 1, wherein the substrate is an optical device substrate.

12. An optical device comprising the anti-reflection coat according to claim 1.

13. The anti-reflection coat according to claim 1, wherein a contact angle of the coating liquid to the intermediate layer is 30° or less.

* * * * *